United States Patent
Yanagimachi et al.

(10) Patent No.: US 7,445,666 B2
(45) Date of Patent: Nov. 4, 2008

(54) INK JET INK, INK JET RECORDING METHOD, INK CARTRIDGE, INK SET AND IMAGE FORMING METHOD

(75) Inventors: Satomi Yanagimachi, Yokosuka (JP); Hiroshi Tomioka, Tokyo (JP); Hiroyuki Takuhara, Yaita (JP); Minako Kawabe, Koganei (JP); Yuuki Nishino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/851,812

(22) Filed: Sep. 7, 2007

(65) Prior Publication Data

US 2008/0007606 A1    Jan. 10, 2008

Related U.S. Application Data

(63) Continuation of application No. PCT/JP2007/055151, filed on Mar. 8, 2007.

(30) Foreign Application Priority Data

Mar. 9, 2006    (JP)    ............................ 2006-064312

(51) Int. Cl.
*C09D 11/02* (2006.01)
*B41J 2/01* (2006.01)

(52) U.S. Cl. .............. 106/31.47; 106/31.49; 106/31.58; 106/31.77; 106/31.78; 106/31.86; 347/100

(58) Field of Classification Search .............. 106/31.47, 106/31.77, 31.58, 31.86, 31.49, 31.78; 347/100
See application file for complete search history.

(56) References Cited

U.S. PATENT DOCUMENTS

| | | | |
|---|---|---|---|
| 5,123,960 A | 6/1992 | Shirota et al. | .................. 106/22 |
| 5,181,045 A | 1/1993 | Shields et al. | ................. 346/1.1 |

(Continued)

FOREIGN PATENT DOCUMENTS

EP        1186413        3/2002

(Continued)

*Primary Examiner*—Helene Klemanski
(74) *Attorney, Agent, or Firm*—Fitzpatrick, Cella, Harper & Scinto

(57) ABSTRACT

An ink jet ink which can form images whose bleeding resistance is high and whose bronzing phenomenon is suppressed, is provided. The ink is an ink jet ink for use together with a pigment ink. The ink jet ink is characterized in that: the ink jet ink contains a coloring material, a polyvalent metal and a water-soluble organic solvent(s); the coloring material is at least a compound represented by the general formula (I); a content (mol/g) of the polyvalent metal is $2.0 \times 10^{-6}$ mol/g or more and $4.0 \times 10^{-4}$ mol/g or less; a total content (mass %) of the water-soluble organic solvent(s) is 25.0 mass % or more with respect to the total mass of the ink; and in a dispersion distance distribution, measured by a small angle X-ray scattering method, of molecular aggregates in the ink jet ink whose coloring material concentration is adjusted to 0.5 mass %, a dispersion distance $d_{75}$ value corresponding to 75% of a distribution is 12.60 nm or less.

General Formula (I):

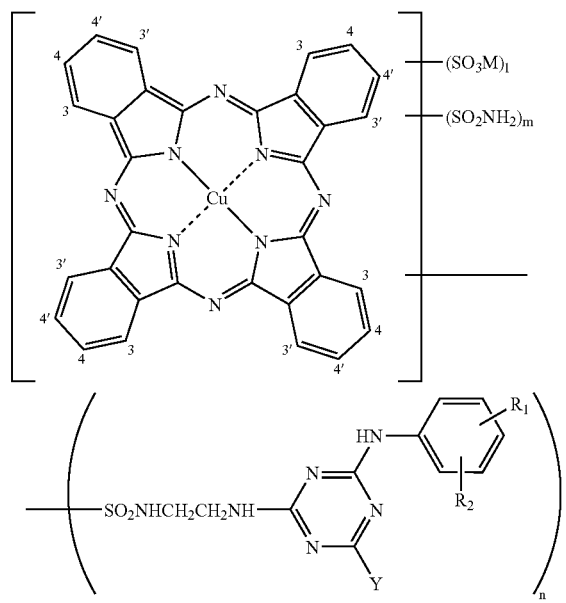

19 Claims, 6 Drawing Sheets

U.S. PATENT DOCUMENTS

| | | | |
|---|---|---|---|
| 5,320,668 A | 6/1994 | Shields et al. | 106/20 R |
| 5,428,383 A | 6/1995 | Shields et al. | 347/96 |
| 5,488,402 A | 1/1996 | Shields et al. | 347/96 |
| 5,507,865 A | 4/1996 | Yoshida et al. | 106/22 H |
| 5,555,008 A | 9/1996 | Stoffel et al. | 347/100 |
| 5,801,738 A | 9/1998 | Stoffel et al. | 347/100 |
| 5,804,320 A | 9/1998 | Tomioka et al. | 428/478.2 |
| 6,139,139 A | 10/2000 | Stoffel et al. | 347/96 |
| 6,460,989 B1 | 10/2002 | Yano et al. | 347/101 |
| 6,517,199 B1 | 2/2003 | Tomioka et al. | 347/101 |
| 6,536,890 B1 | 3/2003 | Kato et al. | 347/100 |
| 6,659,601 B2 | 12/2003 | Goto et al. | 347/100 |
| 6,706,104 B2 | 3/2004 | Takuhara et al. | 106/31.6 |
| 7,025,817 B2 | 4/2006 | Kanke et al. | 106/31.51 |
| 7,160,372 B2 * | 1/2007 | Yoshizawa et al. | 106/31.47 |
| 7,201,791 B2 * | 4/2007 | Okamura et al. | 106/31.47 |
| 7,208,033 B2 | 4/2007 | Kawabe et al. | 106/31.48 |
| 7,241,332 B2 * | 7/2007 | Yoshizawa et al. | 106/31.47 |
| 7,244,299 B2 | 7/2007 | Tsuji et al. | 106/31.48 |
| 7,247,194 B2 * | 7/2007 | Okamura et al. | 106/31.47 |
| 7,270,701 B2 * | 9/2007 | Jinnou et al. | 106/31.47 |
| 7,282,090 B2 * | 10/2007 | Osumi et al. | 106/31.47 |
| 7,297,194 B2 | 11/2007 | Shinjo et al. | 106/31.27 |
| 7,297,197 B2 * | 11/2007 | Jinnou et al. | 106/31.47 |
| 2002/0060721 A1 | 5/2002 | Takada et al. | 347/57 |
| 2006/0102046 A1 | 5/2006 | Okamura et al. | 106/31.47 |
| 2006/0102047 A1 | 5/2006 | Yoshizawa et al. | 106/31.47 |
| 2006/0119682 A1 | 6/2006 | Okamura et al. | 347/100 |
| 2006/0119683 A1 * | 6/2006 | Yoshizawa et al. | 347/100 |
| 2006/0137570 A1 * | 6/2006 | Osumi et al. | 106/31.27 |
| 2006/0152569 A1 | 7/2006 | Jinnou et al. | 347/105 |
| 2006/0194897 A1 | 8/2006 | Kawabe et al. | 523/160 |
| 2007/0022903 A1 | 2/2007 | Fujii et al. | 106/31.47 |
| 2007/0125262 A1 * | 6/2007 | Jinnou et al. | 106/31.47 |

FOREIGN PATENT DOCUMENTS

| | | |
|---|---|---|
| EP | 1767592 | 3/2007 |
| EP | 1767595 | 3/2007 |
| EP | 1775327 | 4/2007 |
| JP | 5-208548 | 8/1993 |
| JP | 6-106841 | 4/1994 |
| JP | 7-228810 | 8/1995 |
| JP | 2942319 | 6/1999 |
| JP | 2002-172783 | 6/2002 |
| JP | 2004-323605 | 11/2004 |
| JP | 2005-120217 | 5/2005 |
| JP | 2006-45534 | 2/2006 |
| JP | 2006-45535 | 2/2006 |
| JP | 2006-63330 | 3/2006 |
| JP | 2006-63333 | 3/2006 |
| WO | WO 2004/087815 | 10/2004 |
| WO | WO 2006/004204 | 1/2006 |
| WO | WO 2006/004210 | 1/2006 |
| WO | WO 2006/011660 | 2/2006 |
| WO | WO 2006/011663 | 2/2006 |

* cited by examiner ial Appli-
INK JET INK, INK JET RECORDING METHOD, INK CARTRIDGE, INK SET AND IMAGE FORMING METHOD

CROSS-REFERENCE TO RELATED APPLICATIONS

This application is a continuation of International Application No. PCT/JP2007/055151, filed Mar. 8, 2007 which claims the benefit of Japanese Patent Application No. 2006-064312, filed Mar. 9, 2006.

BACKGROUND OF THE INVENTION

1. Field of the Invention

The present invention relates to an ink jet ink for use together with a pigmented ink. Particularly, the present invention relates to an ink jet ink which is excellent in the bleeding resistance and can suppress the occurrence of the metallic luster, the so-called bronzing phenomenon, when images are formed on a recording medium. Further, the present invention relates to an ink jet recording method, an ink cartridge, an ink set and an image forming method which are provided by use of the ink jet ink.

2. Description of the Related Art

As a coloring material of an ink jet ink having a hue of cyan, dyes having a phthalocyanine skeleton are broadly used because they are excellent in light resistance, have a high fastness against humidity and temperature, and are good in color developability.

However, problems with phthalocyanine dyes include the easy occurrence of the metallic luster, the so-called bronzing phenomenon, due to high aggregation properties of the dyes. When the bronzing phenomenon occurs on a recorded matter, the optical reflection characteristics change and the color developability and hue of images remarkably change, causing a remarkable decrease in image quality. As methods for improving the bronzing resistance, the following methods are known. For example, the addition of an alkanolamine such as N-hydroxyethylmorpholine, monoethanolamine, diethanolamine or triethanolamine to an ink, and the improvement in the permeability of an ink into a recording medium, are known. The addition of a basic amino acid to an ink is also known (for example, see Japanese Patent Application Laid-Open No. H07-228810).

The phthalocyanine dyes further have a tendency of being inferior in the fastness against environmental gases in the air (ozone, $NO_x$, $SO_2$), especially ozone gas. Particularly, the low fastness in a recorded matter recorded on a recording medium having an ink receiving layer including an inorganic substance such as alumina or silica is outstanding and when the recorded matters are allowed to be left indoor for a long time, the dyes remarkably fade. For improving the ozone resistance, there is a proposal about devising a structure of phthalocyanine dyes (for example, see Japanese Patent No. 2942319, WO 2004/087815 Pamphlet and Japanese Patent Application Laid-Open No. 2004-323605).

On the other hand, on a recording medium, for making full-color images including adjacent regions different in color from each other to be of high quality, there is a problem of effectively suppressing the bleeding (color mixing) on boundaries between the regions of each color, especially boundaries between color images and black images. For improving the bleeding resistance, various attempts have been made. For example, the addition of a polyvalent metal to a color ink in which a dye is used as a coloring material, is known (for example, see Japanese Patent Application Laid-Open No. H06-106841). A method of suppressing the bleeding by aggregating a coloring material (pigment) of an adjacently recorded black ink by adjusting the pH of the color ink to an acid range, is known (for example, see Japanese Patent Application Laid-Open No. H05-208548).

Additionally, higher image-quality has been accomplished in recent years as represented by minimization of ink drops. Hence, inks are required to have much stricter characteristics on reliabilities of clogging and ejection stability of a recording head.

SUMMARY OF THE INVENTION

The present inventors have found that problems arise as described below when a phthalocyanine dye, described in Japanese Patent No. 2942319, WO 2004/087815 Pamphlet and Japanese Patent Application Laid-Open No. 2004-323605, which is improved in weatherability, is used as a coloring material, and a polyvalent metal is made to be contained for improving the bleeding resistance. That is, since a dye and a polyvalent metal coexist in an ink, the solubility of the dye is found to decrease. Particularly, since a phthalocyanine dye has high aggregation properties of the dye itself, the addition of a polyvalent metal to an ink containing a phthalocyanine dye further enhances the aggregation properties and the bronzing phenomenon on a recorded matter is found to be more remarkable.

The bronzing phenomenon is believed to occur because of aggregation of a dye on the surface of a recording medium due to the high aggregation properties of the dye itself, the low permeability of the ink into the recording medium and the like when an ink is applied to the recording medium. The bronzing phenomenon has a tendency of remarkably occurring, particularly in the case where a specific substituent such as an amino group is incorporated to a molecule of a phthalocyanine dye for improving the ozone resistance and in the case of an ink using a dye whose solubility in water is low.

When an additive like an alkanolamine described above is used for suppressing occurrence of the bronzing phenomenon, even if the adding amount is small, the pH of an ink becomes high, 9 or more. With an ink having such a high pH, a problem sometimes arises such as the corrosion of nozzles and the like of a recording head with which the ink contacts. When polyvalent metal ions are present in an ink, such a problem also arises that when the pH of the ink becomes high, the hydrogelation is caused and the aggregation of a dye occurs. Further, although addition of an alkanolamine to an ink provides an effect of suppressing occurrence of the bronzing phenomenon, such a new problem is found to arise that the water resistance of images decrease.

When the permeability of an ink into a recording medium is enhanced for suppressing occurrence of the bronzing phenomenon, decrease in image-quality such as decrease in the bleeding resistance sometimes occurs. Further, in the method described in Japanese Patent Application Laid-Open No. H07-228810 in which a basic amino acid is added to an ink, the pH of the ink is not so much increased. However, it is found that there are cases where the pH rises beyond the neutral range and where the effect on suppressing occurrence of the bronzing phenomenon is insufficient depending on the kind of a water-soluble organic solvent(s).

As described heretofore, conventional technologies cannot provide the bronzing resistance while providing the bleeding resistance at a high level required in recent years.

Accordingly, a first object of the present invention is to provide an ink jet ink which has a high bleeding resistance and can form images in which occurrence of the bronzing phenomenon is suppressed.

A second object of the present invention is to provide an ink jet ink which has a high bleeding resistance and can provide images in which occurrence of the bronzing phenomenon is suppressed, and further, which can provide the ozone resistance at a high level required in recent years.

A third object of the present invention is to provide an ink jet ink which has a high bleeding resistance and can provide images in which occurrence of the bronzing phenomenon is suppressed, and further, which is excellent in the reliability of the ejecting stability and the like.

Further, another object of the present invention is to provide an ink jet recording method, an ink cartridge, an ink set and an image forming method using the above-mentioned ink jet ink.

As a result of studies, the present inventors have found that an ink containing a polyvalent metal provide an excellent bleeding resistance and an enhanced image quality. We have further found that with respect to the bronzing phenomenon, the aggregation properties of a coloring material can be controlled by specifying the content and further the kind of a water-soluble organic solvent(s) in an ink, providing an excellent bronzing resistance. These findings enable the bleeding resistance and the suppression of the bronzing phenomenon to stand together.

An ink jet ink relevant to the first object of the present invention is characterized in that: the ink jet ink is for use together with a pigment ink; the ink jet ink contains a coloring material, a polyvalent metal and a water-soluble organic solvent(s); the coloring material is a compound represented at least by the following general formula (I); a content (mol/g) of the polyvalent metal is $2.0 \times 10^{-6}$ mol/g or more and $4.0 \times 10^{-4}$ or less; a total content (mass %) of the water-soluble organic solvent(s) is 25.0 mass % or more with respect to the total mass of the ink; and in a dispersion distance distribution, measured by a small angle X-ray scattering method, of molecular aggregates in the ink jet ink whose coloring material concentration is adjusted to 0.5 mass %, a dispersion distance $d_{75}$ value corresponding to 75% of a distribution is 12.60 nm or less:

General Formula (I)

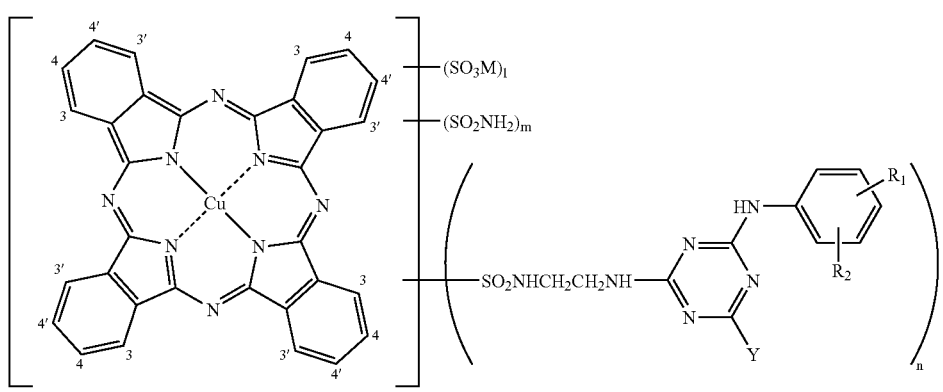

wherein, M represents an alkali metal or ammonium; $R_1$ and $R_2$ each independently represent a hydrogen atom, a sulfonate group or a carboxyl group, provided that $R_1$ and $R_2$ are not simultaneously a hydrogen atom; Y represents a chlorine atom, a hydroxyl group, an amino group or a mono- or di-alkylamino group; l=0 to 2, m=1 to 3 and n=1 to 3, provided that l+m+n=3 to 4; and a substitution position of a substituent is one of 4-position and 4'-position.

An ink jet ink relevant to the second object of the present invention is characterized in that: the ink jet ink is for use together with a pigment ink; the ink jet ink contains a coloring material, a polyvalent metal and a water-soluble organic solvent(s); the coloring material is a compound represented by the following general formula (I); a content (mol/g) of the polyvalent metal is $2.0 \times 10^{-6}$ mol/g or more and $4.0 \times 10^{-4}$ mol/g or less; a total content (mass %) of the water-soluble organic solvent(s) is 15.0 mass % or more with respect to the total mass of the ink; the water-soluble organic solvent(s) includes a water-soluble organic solvent(s) having a specific dielectric constant at 20° C. of 10.0 or more and less than 30.0; the content of a water-soluble organic solvent(s) having a specific dielectric constant at 20° C. of 10.0 or more and less than 30.0 is 25.0 mass % or more with respect to the total content of the water-soluble organic solvent(s) in the ink; and in a dispersion distance distribution, measured by a small angle X-ray scattering method, of molecular aggregates in the ink jet ink whose coloring material concentration is adjusted to 0.5 mass %, a dispersion distance $d_{75}$ value corresponding to 75% of a distribution is 12.60 nm or less:

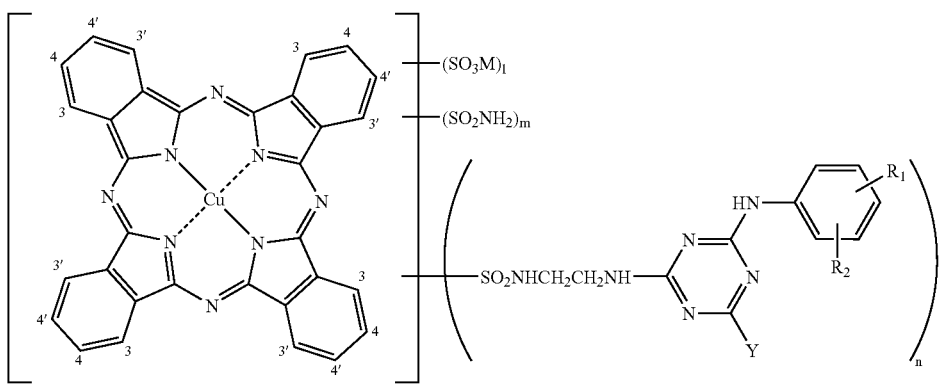

General Formula (I)

wherein, M represents an alkali metal or ammonium; $R_1$ and $R_2$ each independently represent a hydrogen atom, a sulfonate group or a carboxyl group, provided that $R_1$ and $R_2$ are not simultaneously a hydrogen atom; Y represents a chlorine atom, a hydroxyl group, an amino group or a mono- or di-alkylamino group; l=0 to 2, m=1 to 3 and n=1 to 3, provided that l+m+n=3 to 4; and a substitution position of a substituent is one of 4-position and 4'-position.

An ink jet ink relevant to the third object of the present invention is characterized in that the total content (mass %) of the water-soluble organic solvent(s) in the ink jet ink having the above-mentioned constitution is 50.0 mass % or less with respect to the total mass of the ink.

An ink jet recording method relevant to another embodiment of the present invention is characterized in that in the ink jet recording method includes ejecting an ink by an ink jet method to perform recording, the ink is the ink jet ink and a pigment ink having the above-mentioned constitution.

An ink cartridge relevant to yet another embodiment of the present invention is characterized in that in the cartridge equipped with an ink storage portion to store an ink, the ink is the ink jet ink having the above-mentioned constitution.

An ink set relevant to still another embodiment of the present invention is characterized in that the ink set includes a plurality of inks and includes at least a pigment ink and an ink to react with the pigment ink, and the ink to react with the pigment ink is the ink jet ink having the above-mentioned constitution.

An image forming method relevant to another embodiment of the present invention is characterized in that the image forming method forms images at least using a pigment ink and an ink to react with the pigment ink, and the ink to react with the pigment ink is the ink jet ink having the above-mentioned constitution.

A first invention relevant to the first object of the present invention can provide an ink jet ink which has a high bleeding resistance and can form images in which occurrence of the bronzing phenomenon is suppressed. A second invention relevant to the second object of the present invention can provide an ink jet ink which has a high bleeding resistance, can form images in which occurrence of the bronzing phenomenon is suppressed and further can provide the ozone resistance at a high level required in recent years. A third invention relevant to the third object of the present invention can provide an ink jet ink which has a high bleeding resistance, can form images in which occurrence of the bronzing phenomenon is suppressed and further can provide the reliability of the ejection stability and the like. Further, another embodiment of the present invention can provide an ink jet recording method, an ink cartridge, an ink set and an image forming method using the above-mentioned ink jet ink.

Further features of the present invention will become apparent from the following description of exemplary embodiments with reference to the attached drawings.

DESCRIPTION OF THE EMBODIMENTS

Figure 1:
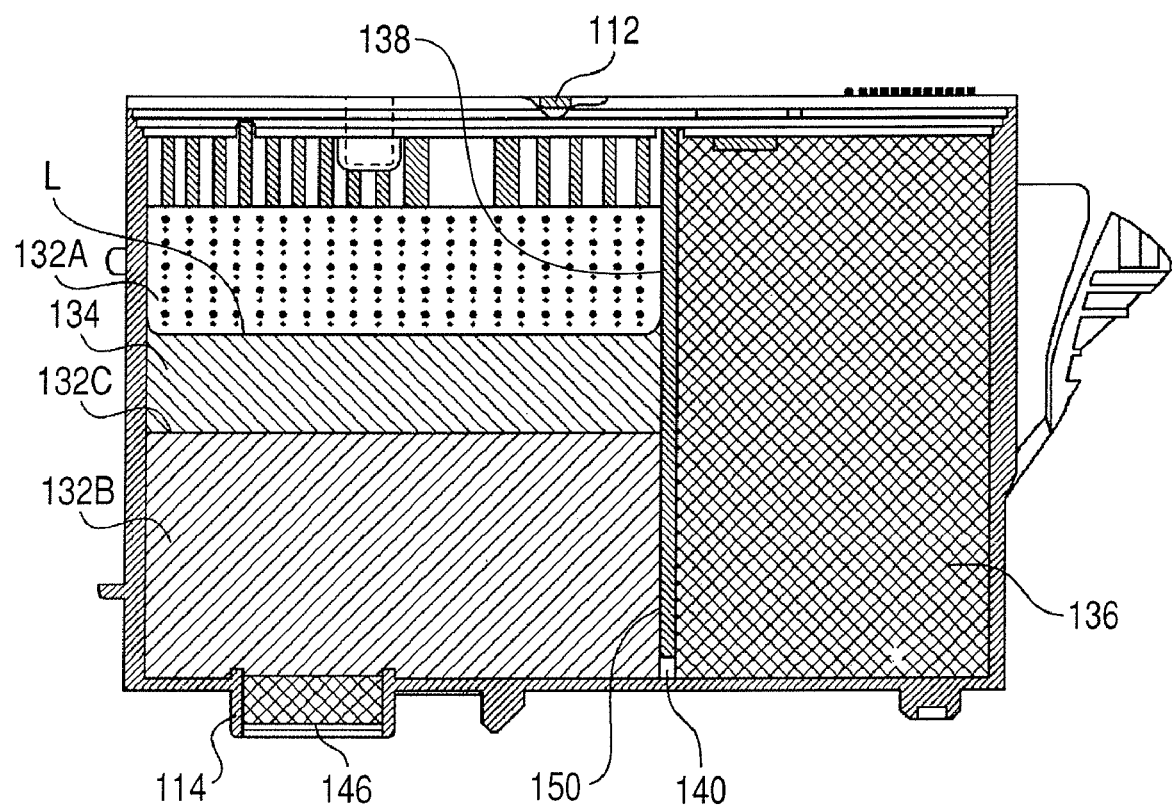
FIG. 1 is an illustrative view of an ink cartridge.

Hereinafter, the present invention will be in detail described by way of exemplary embodiments.

In the present invention, when a coloring material is a salt, although the salt dissociates in an ink and is present as ions, the salt is expressed as "containing a salt" for convenience. Although a polyvalent metal also dissociates in an ink and is present as ions, the polyvalent metal is expressed as "containing a polyvalent metal" for convenience.

<Reactive Ink>

A reactive ink in the present invention means an ink jet ink (hereinafter, referred to as ink) which destabilizes the dispersion state of a pigment in the pigment ink when the reactive ink contacts with the pigment ink on a recording medium. Hereinafter, components and others constituting the reactive ink will be described.

(Coloring Material)

Compound Represented by the General Formula (I)

A reactive ink essentially contains as a coloring material at least a compound represented by the general formula (I). The compound represented by the general formula (I) or its salt is a phthalocyanine derivative characterized by having a cyan hue and being excellent in the ozone resistance.

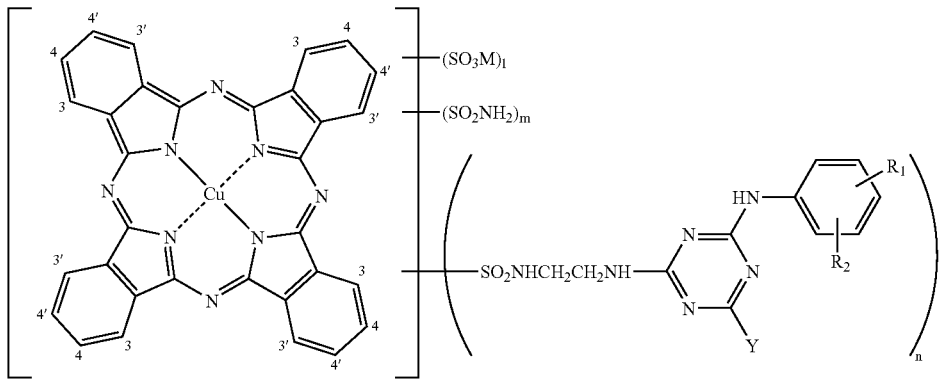

General Formula (I)

wherein, M represents an alkali metal or ammonium; $R_1$ and $R_2$ each independently represent a hydrogen atom, a sulfonate group or a carboxyl group, provided that $R_1$ and $R_2$ are not simultaneously a hydrogen atom; Y represents a chlorine atom, a hydroxyl group, an amino group or a mono- or di-alkylamino group; l=0 to 2, m=1 to 3 and n=1 to 3, provided that l+m+n=3 to 4; and a substitution position of a substituent is one of 4-position and 4'-position.

Generally, a phthalocyanine derivative often inevitably includes isomers of substitution positions (the carbon positions on a benzene ring with which $R_1$ to $R_{16}$ are bonded are defined as 1-position to 16-position, respectively) of the substituents $R_n$ (n: 1 to 16) in the general formula (II). However, these substitution-position isomers are not commonly discriminated from each other and often regarded as the same derivative.

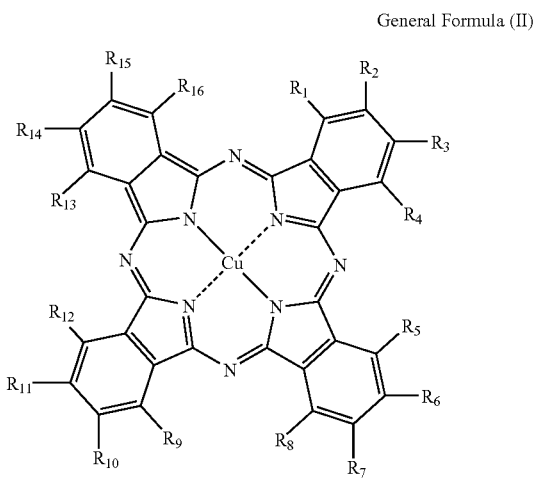

General Formula (II)

A coloring material used in the present invention is a phthalocyanine derivative into which an unsubstituted sulfamoyl group (—SO$_2$NH$_2$) or a substituted sulfamoyl group (a group represented by the general formula (III) is incorporated selectively only at a 4- and/or 4'-position of the general formula (I). The 4- and 4'-positions in the general formula (I) mean $R_2$, $R_3$, $R_6$, $R_7$, $R_{10}$, $R_{11}$, $R_{14}$ and $R_{15}$ in the general formula (II). The present inventors have found that a recorded matter obtained using an ink containing such a compound have a very excellent ozone resistance.

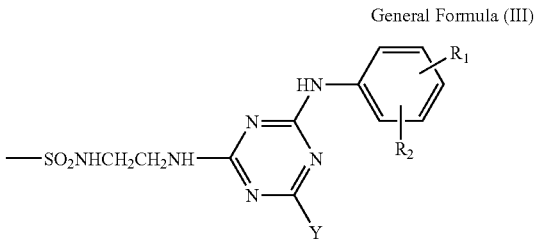

General Formula (III)

The synthesis of a compound represented by the general formula (I) or its salt used in the present invention uses as a raw material a phthalocyanine compound obtained by reacting a 4-sulfophthalic acid derivative, or a 4-sulfophthalic acid derivative and a phthalic acid (anhydride) derivative in the presence of a metal compound. Further, after a sulfonate group of the phthalocyanine compound is converted to a sulfonyl chloride group, the compound represented by the general formula (I) or its salt is obtained by reacting the converted phthalocyanine compound with an aminating agent in the presence of an organic amine.

Specific examples of substituted sulfamoyl groups represented by the general formula (III) are shown below. Substituted sulfamoyl groups used in the present invention are not of course limited thereto. The substituted sulafamoyl groups represented by the general formula (III) are shown as free acids.

Exemplified Substituent 1

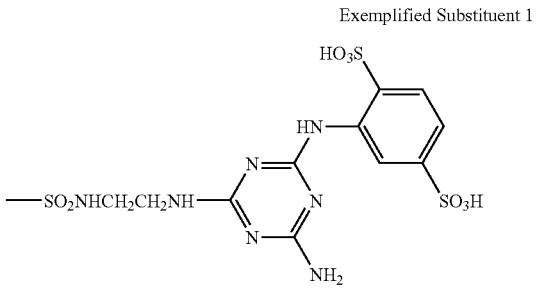

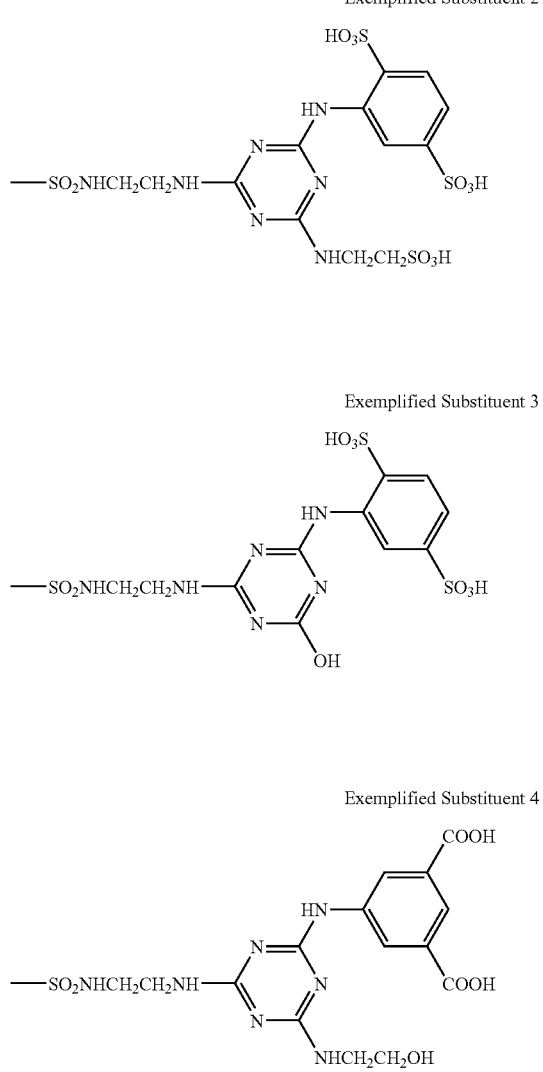
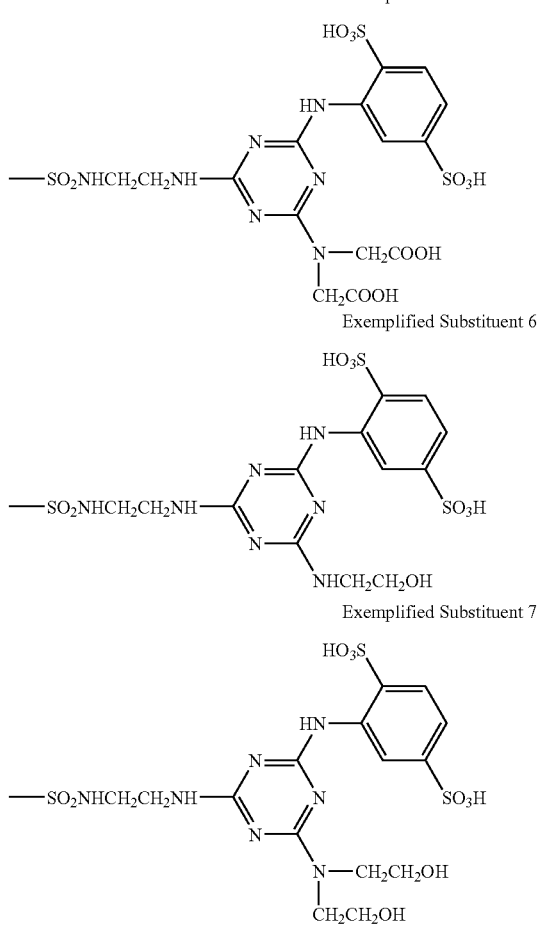
Among them, a compound in which the substituent example 1 is substituted, namely, a compound represented by the following general formula (IV) is a most suitable compound because of the balance of the color developability and the ozone resistance.
General Formula (IV)
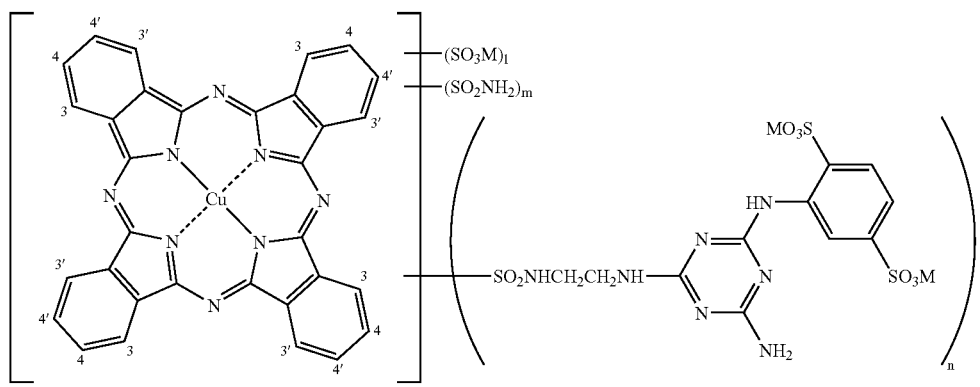

wherein, M represents an alkali metal or ammonium; l=0 to 2, m=1 to 3 and n=1 to 3, provided that l+m+n=3 to 4; and a substitution position of a substituent is one of 4-position and 4'-position.

The content (mass %) of the compound represented by the general formula (I) in a reactive ink can be 0.5 mass % or more with respect to the total mass of the ink. Further, for providing a sufficient color developability, the content (mass %) of the compound represented by the general formula (I) in the reactive ink can be 3.0 mass % or more with respect to the total mass of the ink. For making ink jet characteristics such as ejection stability to be excellent, the content (mass %) of the compound represented by the general formula (I) in the reactive ink can be 10.0 mass % or less with respect to the total mass of the ink. Particularly, the content (mass %) of the compound represented by the general formula (I) in the reactive ink can be 3.0 mass % or more and 10.0 mass % or less with respect to the total mass of the ink.

Small Angle X-Ray Scattering Method

The small angle X-ray scattering method is applicable to the measurement of the aggregation properties of a coloring material used in the present invention.

The small angle X-ray scattering method is a technique having been used in general-purpose for calculation of distances between colloid particles in a colloidal solution. Its versatility is clear from descriptions of "Saishin Colloid Kagaku" (Latest Colloid Chemistry) written in Japanese (F. Kitahara, K. Furusawa, Kodansha Scientific Ltd.), "Hyomen Jotai To Colloid Jotai" (Surface State and Colloid State) written in Japanese (M. Nakagaki, Tokyo Kagaku Dozin Co., Ltd.) and other books.

Figure 5:
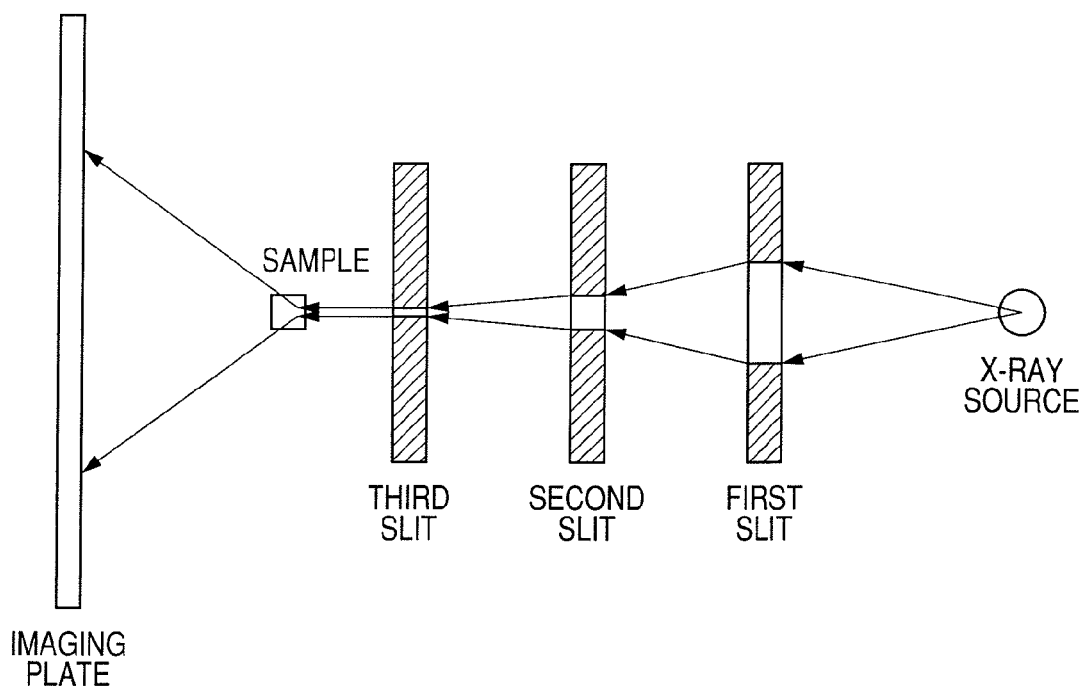
FIG. 5 is a view illustrating the measurement principle of a small angle X-ray scattering.

The outline of a small angle X-ray scattering apparatus will be described using FIG. 5, which is a view showing the measurement principle of the small angle X-ray scattering method. The focal spot size of each of X-rays generated from an X-ray source is reduced to about several millimeters during the passing of the X-rays through first to third slits, and a sample solution is irradiated with the X-rays. The X-rays with which the sample solution is irradiated are scattered by particles in the sample solution before the X-rays are detected on an imaging plate. Since the scattered X-rays interfere with each other because of an optical path difference between them, a distance d value between particles can be determined on the basis of Bragg equation (the following expression (1)) using the resultant θ value. When particles are arranged to be equidistance, the d value determined here is considered to be a distance from the center of a particle to the center of an adjacent particle.

$$d = \lambda/2 \cdot \sin \theta \qquad \text{Equation (1)}$$

(In the expression (1), λ represents a wavelength of X-rays; d represents a distance between particles; and θ represents a scattering angle).

Figure 6:
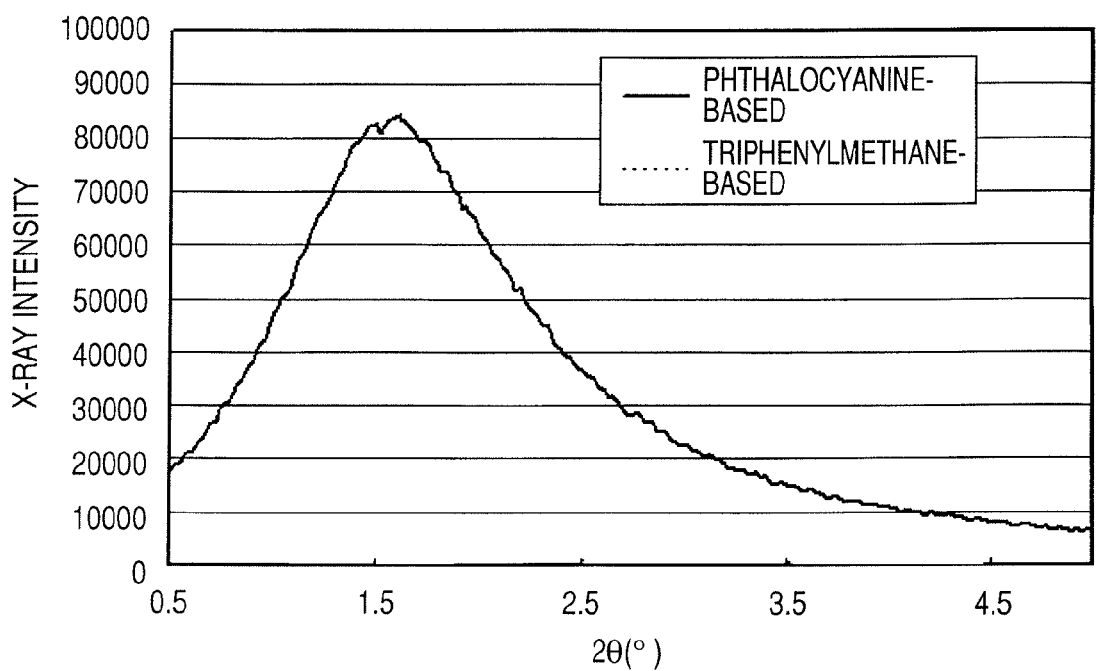
FIG. 6 is a small-angle X-ray scattering profile of each of a phthalocyanine-based dye and a triphenylmethane-based dye.

Generally, when particles in a sample solution are not orderly disposed, the scattering angle profile generates no peak. In the case of an aqueous solution of a coloring material (phthalocyanine-based coloring material) used in the present invention, a strong peak having a maximum value in the range of 2θ=0° to 5° is detected and particles (molecular aggregates) formed by aggregation of molecules of the phthalocyanine coloring material are confirmed to be disposed in a certain rule. FIG. 6 shows scattering angle profiles of respective 10-mass % aqueous solutions of a triphenylmethane-based coloring material having a structure represented by the following compound (1) and a phthalocyanine-based coloring material having a structure represented by the general formula (I). From FIG. 6, it is clear that the phthalocyanine-based coloring material has specifically a peak of scattering angle among the coloring materials having the same cyan hue. Specifically, in the phthalocyanine-based coloring material, phthalocyanine molecules aggregate in some numbers in an aqueous solution to form molecular aggregates. Distances between molecular aggregates have a certain distribution as shown in the scattering angle profile.

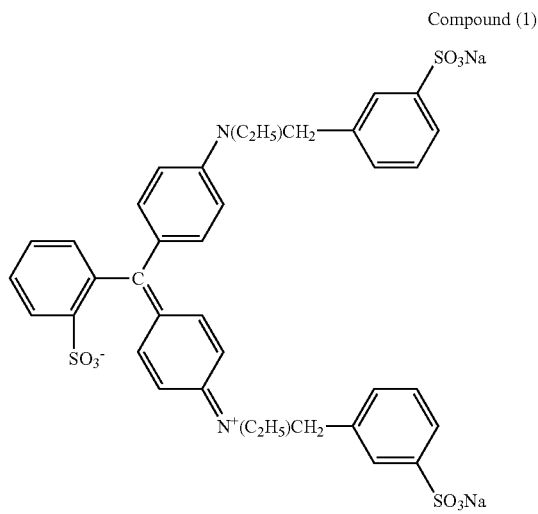

Compound (1)

Figure 7:
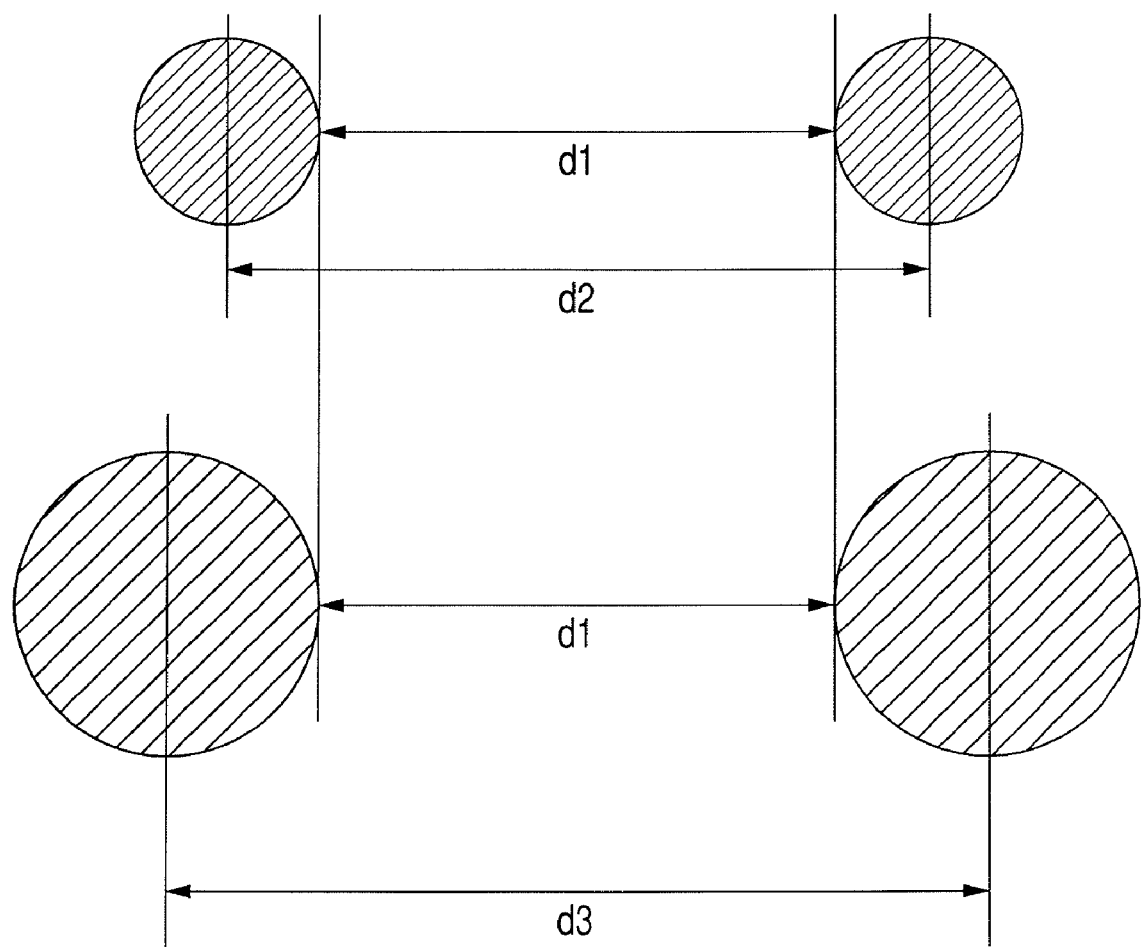
FIG. 7 is a conceptual view of the dispersion distance of molecular aggregates of a phthalocyanine-based dye.

FIG. 7 is a conceptual view of the dispersion distance of molecular aggregates of a phthalocyanine-based coloring material. As shown in FIG. 7, $r_1$ refers to a radius of a molecular aggregate of a phthalocyanine-based coloring material, and $d_1$ refers to a distance between molecular aggregates. Assuming that if a phthalocyanine-based coloring material has the same structure, $d_1$ is always constant, the d value measured by the small angle X-ray scattering method is believed to increase from $d_2$ to $d_3$ as the radius of molecular aggregates that the phthalocyanine-based coloring material forms increases from $r_1$ to $r_2$. Therefore, the d value measured by the method is believed to be an index denoting the size of molecular aggregates of a phthalocyanine-based coloring material, and with a larger d value, the size of molecular aggregates that the phthalocyanine-based coloring material forms is believed to be larger.

Examination of the relationship between the d value and the bronzing phenomenon in an ink containing a phthalocyanine-based coloring material reveals that in the case of the phthalocyanine-based coloring material represented by the same structural formula, a larger d value has a tendency of more readily generate the bronzing phenomenon. Taking into consideration that the bronzing phenomenon is generated by aggregation of coloring material molecules on a recording medium, the result substantiates that there is a correlation between the d value and the size of molecular aggregates.

The peak shape of a scattering angle profile indicates a distribution of distances between molecular aggregates, namely, a distribution of dispersion distances of molecular aggregates. Taking into consideration that the dispersion distance is an index denoting the size of molecular aggregates as described above, such a scattering angle profile can be said to indicate a size distribution of molecular aggregates in a sample solution. Specifically, the larger d value, that is, the higher frequency of larger molecular aggregates is more likely to generate the bronzing phenomenon, provided that the peak area of a scattering angle profile corresponds to the total sum size of the molecular aggregates in a sample solution. Therefore, generation of the bronzing phenomenon is believed to be suppressed by reducing the frequency of large molecular aggregates, which readily generate the bronzing phenomenon. However, in the case of an ink containing remarkably small molecular aggregates only, although the bronzing phenomenon is hardly generated, the ozone resistance decreases simultaneously. Hence, precise control of the size (size of d value) of molecular aggregates is necessary also from the viewpoint of suppressing generation of the bronzing phenomenon and providing the ozone resistance.

When the size of coloring material molecules has a distribution of some frequency, the threshold of the visual range limit which can be visually recognized by human is said to be ¼ of the whole amount. From this, the d value at a point where large molecular aggregates, which readily generate the bronzing phenomenon, correspond to ¼ or less of the whole molecular aggregates, in other words, the d value at a point where small molecular aggregates, which hardly generate the bronzing phenomenon, correspond to ¾ or more of the whole, is defined as the dispersion distance, $d_{75}$ value. Control of the $d_{75}$ value in a specific range allows to provide an ink suppressing occurrence of the bronzing phenomenon and having a high ozone resistance.

The correlation between the $d_{peak}$ value actually calculated from the peak of 2θ values in a scattering angle profile and the above-mentioned $d_{75}$ value, and the generating level of the bronzing phenomenon was examined. The result reveals that the $d_{75}$ value obtained in consideration of the distribution factor of the size of the whole molecular aggregates has a higher correlation with the bronzing phenomenon than the $d_{peak}$ value. The base line for determining 2θ values is drawn in the range from 0.5° to 5°.

Then, the present inventors conducted the following experiments by using compounds of phthalocyanine dyes represented by the general formula (I) or its salt whose number of substituents, kinds thereof and substitution positions are changed, namely, dyes whose aggregation properties are changed. An ink containing the dye was prepared and the scattering angle profile of the ink was measured to calculate the $d_{75}$ value. Then, the aggregation properties of each coloring material were evaluated from the obtained $d_{75}$ value. The result revealed that the $d_{75}$ value of 12.60 nm or less effectively suppresses generation of the bronzing phenomenon and provides an ink having a specially high ozone resistance, and further that the $d_{75}$ value of 6.70 nm or more especially effectively suppresses generation of the bronzing phenomenon and has a high ozone resistance. That is, it was found that in an ink containing a compound represented by the general formula (I), when the aggregation properties of a dye is controlled such that the $d_{75}$ value of an ink takes the above range, generation of the bronzing phenomenon is suppressed and a high ozone resistance is provided.

A method for controlling the $d_{75}$ value involves, for example, selection of substituents of a compound represented by the general formula (I). Specifically, with smaller values of l and n and larger value of m in the general formula (I), the $d_{75}$ value has a tendency of being larger. Further, the kind and content of a polyvalent metal and the kind and content of a water-soluble organic solvent(s) also can have the influence on the $d_{75}$ value.

The measurement condition of a reactive ink by the small angle X-ray scattering method is as follows.

Apparatus: Nano Viewer (manufactured by Rigaku)
X-ray source: Cu—Kα
Output: 45 kV-60 mA
Effective focal spot: 0.3 mmφ+Confocal Max-Flux Mirror
$1^{st}$ Slit: 0.5 mm, $2^{nd}$ Slit: 0.4 mm, $3^{rd}$ Slit: 0.8 mm
Irradiation time: 240 min
Beam stopper: 3.0 mmφ
Measurement method: Penetration method
Detector: Blue Imaging Plate A peak area obtained by removing a background and a 2θ value corresponding to 75% or more of the entire peak area ($2θ_{75}$ value) were measured from the resultant scattering angle profile by means of an X-ray diffraction data processing soft JADE (Material Data, Inc.). The $d_{75}$ value was calculated from the 2θ75 value on the basis of the following equation (2):

$$d_{75} = λ/2·\sin θ_{75} \quad \text{Equation (2).}$$

Other Coloring Materials

For a reactive ink, other coloring materials may be used other than the compound represented by the general formula (I) for the purposes of color toning and the like. The other coloring materials may be well-known ones or newly synthesized ones.

(Polyvalent Metal)

A reactive ink contains a polyvalent metal, the content (mol/g) of which is essentially $2.0×10^{-6}$ mol/g or more and $4.0×10^{-4}$ mol/g or less. As described above, when a reactive ink contacts with a pigment ink, the reactive ink destabilizes the dispersion state of a pigment in the pigment ink. For a reactive ink to have the above-mentioned function, the reactive ink must contain a polyvalent metal in the present invention. Specifically, since the reactive ink contains a polyvalent metal, when the reactive ink and the pigment ink contact and mix with each other on a recording medium, cations in the reactive ink react with an anionic group in the pigment in the pigment ink. As a result, the dispersion breakage of the pigment occurs and the aggregation of the pigment is promoted and the viscosity of the pigment ink increases. "The content of a polyvalent metal" in the present invention means not containing copper, which is the center metal of a phthalocyanine dye. A polyvalent metal is present as ions in an ink, but in the present invention, this is expressed as "an ink contains a polyvalent metal" and "the content of a polyvalent metal" means a value calculated not as the ionic form but as the metal atom.

A polyvalent metal usable for a reactive ink can include a bi- or more-valent metal ion and a negative ion bonded to the polyvalent metal ion, and can be added in the reactive ink in the salt form soluble in water. Specific examples of polyvalent metals include bivalent metal ions such as $Mg^{2+}$, $Ca^{2+}$, $Cu^{2+}$, $Co^{2+}$, $Ni^{2+}$, $Zn^{2+}$ and $Ba^{2+}$, and trivalent ions such as $Al^{3+}$, $Fe^{3+}$, $Cr^{3+}$ and $Y^{3+}$. The negative ions include $SO_4^{2-}$, $Cl^-$, $CO_3^-$, $NO_3^-$, $I^-$, $Br^-$, $ClO_3^-$, $CH_3COO^-$ and $HCOO^-$. In the present invention, from the viewpoint of the preservation stability of a reactive ink, the unsolubility of members (ink flow path and the like constituting an ink jet recording apparatus) contacting with the reactive ink, and the like, especially $Mg^{2+}$ can be used among the above-mentioned polyvalent metal ions. Further, from the viewpoint of the solubility, $NO_3^-$, $SO_4^{2-}$ and $Cl^-$ can be used among the above-mentioned negative ions. $NO_3^-$ can especially be used because of its superiority in the solubility in water.

The content (mol/g) of a polyvalent metal in a reactive ink can be $2.0\times10^{-6}$ mol/g or more and $4.0\times10^{-4}$ mol/g or less, and further can be $7.8\times10^{-5}$ mol/g or more and $4.0\times10^{-4}$ mol/g or less. By making the content of a polyvalent metal in the above-mentioned range, effects on the stability as an ink (solubility, ejecting stability and the like of a coloring material) and the improved bleeding resistance are fully provided.

(Aqueous Medium)

A reactive ink is obtained by dissolving the coloring material described above in water or an aqueous medium of a mixed solvent of water and a water-soluble organic solvent(s). The water can be a deionized water (ion exchange water). The content (mass %) of water can be 10.0 mass % or more and 70.0 mass % or less with respect to the total mass of the ink.

A first embodiment of the present invention essentially has a following constitution. A reactive ink contains a water-soluble organic solvent(s) and the total content (mass %) of the water-soluble organic solvent(s) is essentially 25.0 mass % or more with respect to the total mass of the ink. The total content (mass %) of the water-soluble organic solvent(s) can be 50.0 mass % or less with respect to the total mass of the ink.

A second embodiment of the present invention essentially has a following constitution. A reactive ink contains a water-soluble organic solvent(s) in a specific content, and the water-soluble organic solvent(s) must include in a specific proportion a water-soluble organic solvent(s) having a particular specific dielectric constant described later. Here, the contents of these water-soluble organic solvents must satisfy the following relationship. First, the total content (mass %) of the water-soluble organic solvent(s) in the reactive ink must be 15.0 mass % or more with respect to the total mass of the ink. Further, the content of the water-soluble organic solvent(s) having a particular specific dielectric constant is essentially 25.0% or more with respect to the total content of the water-soluble organic solvent(s) in an ink. The total content (mass %) of the water-soluble organic solvent(s) in an ink can be 50.0 mass % or less with respect to the total mass of the ink. The content of the water-soluble organic solvent(s) having a particular specific dielectric constant can be 50.0% or less with respect to the total content of the water-soluble organic solvent(s) in an ink.

The following water-soluble organic solvents, for example, can be specifically used. These water-soluble organic solvents may be used singly or as a mixture thereof. These include alkyl alcohols having 1 to 4 carbon atoms such as ethanol, isopropanol, n-butanol, isobutanol, secondary butanol and tertiary butanol, carboxylic amides such as N,N-dimethylformamide and N,N-dimethylacetamide, ketones and keto-alcohols such as acetone, methyl ethyl ketone and 2-methyl-2-hydroxypentane-4-one, cyclic ethers such as tetrahydrofuran and dioxane, glycerin, alkylene glycols such as ethylene glycol, diethylene glycol, triethylene glycol, tetraethylene glycol, 1,2- or 1,3-propylene glycol, 1,2- or 1,4-butylene glycol and polyethylene glycol, polyhydric alcohols such as 1,3-butanediol, 1,5-pentanediol, 1,2-hexanediol, 1,6-hexanediol, 2-methyl-1,3-propanediol and 1,2,6-hexanetriol, acetylene glycol derivatives, alkyl ethers of polyhydric alcohols such as ethylene glycol monomethyl(or ethyl)ether, diethylene glycol monomethyl(or ethyl)ether and triethylene glycol monoethyl(or butyl)ether, heterocyclic compounds such as 2-pyrrolidone, N-methyl-2-pyrrolidone, 1,3-dimethyl-2-imidazolidinone and N-methylmorpholine, sulfur-containing compounds such as thiodiglycol and dimethylsulfoxide, urea derivatives such as urea and ethylene urea, trimethylolethane and trimethylolpropane.

The water-soluble organic solvent(s) having a particular specific dielectric constant in the present invention means a water-soluble organic solvent(s) having a specific dielectric constant at 20° C. of 10.0 or more and less than 30.0. Hereinafter, the value of a specific dielectric constant is a value at 20° C. as long as not otherwise specified. With respect to a compound which is a solid at 20° C., the specific dielectric constant cannot be measured in solid state. Hence, in the present invention, a compound which is a solid at 20° C. is defined not to correspond to "a water-soluble organic solvent(s) having a specific dielectric constant at 20° C. of 10.0 or more and less than 30.0". A water-soluble organic solvent(s) having a specific dielectric constant of 30.0 or more has a tendency of not much exhibiting the effect of suppressing the bronzing phenomenon. A water-soluble organic solvent(s) having a specific dielectric constant of less than 10.0 sometimes brings about a low water-solubility and a worsened sticking tendency at a recording head. Hence, in the second embodiment of the present invention, making an ink containing in a specific content a water-soluble organic solvent(s) having the above-mentioned particular specific dielectric constant allows to remarkably suppress occurrence of the bronzing phenomenon due to a mechanism described below. A water-soluble organic solvent(s), usable in the present invention, having a particular specific dielectric constant is not especially limited as long as the specific dielectric constant is in the specific range described above. In the present invention, the water-soluble organic solvent(s) having a specific dielectric constant of 10.0 or more and less than 30.0 can be at least one selected from the group of isopropyl alcohol, 2-pyrrolidone, 1,5-pentanediol, 1,2,6-hexanetriol, polyethylene glycol (average molecular weight: 200) and the like, especially isopropyl alcohol, 2-pyrrolidone, 1,2,6-hexanetriol and polyethylene glycol (average molecular weight: 200) among the above.

In the reactive ink relevant to the first embodiment of the present invention and the reactive ink relevant to the second embodiment, making the contents of the water-soluble organic solvents in an ink to be of the respective constitutions described above can remarkably suppress occurrence of the bronzing phenomenon. The present inventors presume the mechanism providing such an effect as follows.

Mechanism Providing an Effect by the First Embodiment

As described above also, the first embodiment of the present invention essentially has the following constitution. A reactive ink contains a water-soluble organic solvent(s) and the total content (mass %) of the water-soluble organic solvent(s) is essentially 25.0 mass % or more with respect to the total mass of the ink. Making the content of a water-soluble organic solvent(s) in an ink to be much in such a way increases the amount of the water-soluble organic solvent(s) solvating a phthalocyanine dye and polyvalent metal ions. Hence, the phthalocyanine dye and the polyvalent metal ions can hardly approach to each other, hardly generating the aggregation. Making the content of a water-soluble organic solvent(s) in an ink to be much causes, when a phthalocyanine dye and polyvalent metal ions coexist, the polyvalent metal ions to be adsorbed to anionic polar groups of the phthalocyanine dye and the dye to aggregate to some extent to form primary aggregates. Thereafter, the amount of the water-soluble organic solvent(s) solvating the primary aggregates increases. Hence, the primary aggregates hardly approach to each other, hardly generating the secondary aggregation. According to such a mechanism, making the total content of the water-soluble organic solvent(s) in an ink to be 25.0 mass % or more is believed to remarkably suppress occurrence of the bronzing phenomenon. In the first embodiment, the total content of the water-soluble organic solvent(s) in an ink of less than 25.0 mass % sometimes does not provide the effect described above.

Mechanism Providing an Effect by the Second Embodiment

As described above also, the second embodiment of the present invention essentially has the following constitution. A reactive ink must contain in a specific proportion a water-soluble organic solvent(s) and the water-soluble organic solvent(s) must contain in a specific proportion a water-soluble organic solvent(s) having a specific dielectric constant of 10.0 or more and less than 30.0. Here, the contents of these water-soluble organic solvents must satisfy the following relationship. First, the total content (mass %) of the water-soluble organic solvent(s) in the reactive ink must be 15.0 mass % or more with respect to the total mass of the ink. Further, the content of the water-soluble organic solvent(s) having a specific dielectric constant of 10.0 or more and less than 30.0 is essentially 25.0% or more with respect to the total content of the water-soluble organic solvent(s) in an ink. Specifically, the total content of the water-soluble organic solvent(s) must be 15.0 mass % or more and ((the content of a water-soluble organic solvent(s) having a specific dielectric constant of 10.0 or more and less than 30.0)/(the total content of the water-soluble organic solvent(s))) must be 25.0% or more.

Adsorption of polyvalent metal ions to anionic polar groups of a phthalocyanine dye and formation of primary aggregates by the aggregation of the dye to some extent decrease ionicity of the primary aggregates. Further, since the phthalocyanine dye has a bulky molecular skeleton, the phthalocyanine dye becomes nearly nonpolar. Additionally, the water-soluble organic solvent(s) having a low specific dielectric constant of 10.0 or more and less than 30.0 has a low polarity. Therefore, since an ink containing much of a water-soluble organic solvent(s) having a low specific dielectric constant has a low polarity, the solubility of primary aggregates becomes high, suppressing the association of the primary aggregates themselves. According to such a mechanism, making the total content of the water-soluble organic solvent(s) in an ink to be 15.0 mass % or more and the proportion of a water-soluble organic solvent(s) having a particular specific dielectric constant to be 25.0% or more is believed to remarkably suppress occurrence of the bronzing phenomenon. In the second embodiment, if the total content of the water-soluble organic solvent(s) is less than 15.0 mass % and the content of a water-soluble organic solvent(s) having an above-mentioned particular specific dielectric constant is less than 25.0% with respect to the total content of the water-soluble organic solvent(s), the effect described above is not sometimes provided.

On the other hand, a water-soluble organic solvent(s) having a high specific dielectric constant of 30.0 or more has a high polarity. Hence, since an ink containing much of a water-soluble organic solvent(s) having a high specific dielectric constant has a high polarity, the solubility of the primary aggregates becomes low and the association of the primary aggregates themselves is believed to easily occur. However, in this case, as described above in the first embodiment, making the total content of the water-soluble organic solvent(s) in an ink to be as high as 25.0 mass % or more is believed to suppress occurrence of the bronzing phenomenon.

Further, when a reactive ink is applied on a recording medium and a water-soluble organic solvent(s) in the reactive ink infiltrates a receiving layer of the recording medium, since a water-soluble organic solvent(s) having a low specific dielectric constant has a low polarity, the water-soluble organic solvent(s) easily shields the charge of the receiving layer of the recording medium and the cationicity is weakened. As a result, it is conceivable that the reactive ink applied on the recording medium may eventually hardly generate the solid-liquid separation; the dye infiltrates deeply into the recording medium; and the bronzing phenomenon hardly occurs. It is also conceivable that the same phenomenon occurs in the case where the total content of the water-soluble organic solvent(s) in the reactive ink in the first embodiment is high.

Since a more bulky molecular structure of a water-soluble organic solvent(s) more easily causes the steric hindrance, the aggregation is believed to be alleviated because the phthalocyanine dye and the polyvalent metal ions, or the primary aggregates themselves hardly approach to each other. Further, when a reactive ink is applied on a recording medium, evaporation of a water-soluble organic solvent(s) in the reactive ink occurs on the recording medium. Hence, since a water-soluble organic solvent(s) which has a high boiling point or is a solid at ordinary temperatures does not evaporate on a recording medium, the aggregation may be suppressed because the water-soluble organic solvent(s) stays near at the phthalocyanine dye, the polyvalent metal ions or the primary aggregates.

(Additives)

A reactive ink may contain various additives other than components described above, such as surfactants, pH adjusting agents, chelating agents, rust preventives, preservatives, fungicides, ultraviolet absorbents, viscosity adjusting agents, defoaming agents and water-soluble polymers.

The surfactants include, for example, anionic surfactants, amphoteric surfactants, cationic surfactants and nonionic surfactants. Among them, as nonionic surfactants, Acetylenol: EH, E100 (Kawaken Fine Chemicals Co., Ltd.) and the like, Surfinol: 104, 82, 465, Olfine STG (Nisshin Chemical Industry Co., Ltd.) and the like can be used.

The pH adjusting agents can be optional ones as long as they can adjust the pH of an ink in the range of 6.0 or more and 11.0 or less. Specifically, usable examples are alcohol amine compounds such as diethanolamine, triethanolamine, isopropanolamine and trishydroxymethylaminomethane, hydroxides of alkali metals such as lithium hydroxide and potassium hydroxide, ammonium hydroxide, and carbonates of alkali metals such as lithium carbonate, sodium carbonate and potassium carbonate.

Among the above listed pH adjusting agents, especially the following can be used because they provide the effect of suppressing occurrence of the bronzing phenomenon. For example, alcohol amine compounds such as diethanolamine, triethanolamine, isopropanolamine and trishydroxymethylaminomethane, and carbonates of alkali metals such as lithium carbonate, sodium carbonate and potassium carbonate can be used.

<Pigment Ink>
(Coloring Material)
[Carbon Black]

When a pigment ink is used as a black ink, a carbon black can be used as a coloring material. The dispersion form of a carbon black in a pigment ink may be any of forms of self-dispersion type, resin dispersion type in which a resin or the like is used as a dispersant, and other types.

The self-dispersion carbon black can be one in which at least a hydrophilic group (anionic group or cationic group) is bonded to the surface of the carbon black particles directly or through another atomic group (—R—). Use of a carbon black having such a constitution makes unnecessary the addition of a dispersant to disperse the carbon black in an aqueous medium, or can make the addition of the dispersant in a small amount. In the case of a carbon black in which an anionic group is bonded to the surface of the carbon black particles directly or through another atomic group, the anionic group to be used includes, for example, $-(COO(M_1))_n$, $-SO_3(M_1)$, $-PO_3H(M_1)$ and $-PO_3H(M_1)_2$. Wherein, $M_1$ is a hydrogen atom, alkali metal, ammonium or organic ammonium; and n is one or more. Among them, especially a self-dispersion carbon black which is anionically charged by bonding $-COO(M_1)$ or $-SO_3(M_1)$ as an anionic group to the surface of the carbon black particles is preferable because of the favorable dispersibility in a pigment ink. The another atomic group (—R—) includes an alkylene group and an aromatic ring. The alkylene group in the present invention includes, for example, methylene group, ethylene group and propylene group. The aromatic ring in the present invention includes, for example, benzene ring and naphthalene ring. The present invention is of course not limited thereto.

Specific examples of carbon blacks include furnace black, lamp black, acetylene black and channel black. Specifically, the following commercially available products can be used. The present invention is of course not limited thereto.

They include Raven: 7000, 5750, 5250, 5000ULTRA, 3500, 2000, 1500, 1250, 1200, 1190ULTRA-II, 1170, 1255 (Columbian Chemicals Co.); Black Pearls L, Regal: 330R, 400R, 660R, Mogul L, Monarch: 700, 800, 880, 900, 1000, 1100, 1300, 1400, 2000, Vulcan XC-72R (Cabot Corp.); Color Black: FW1, FW2, FW2V, FW18, FW200, S150, S160, S170, Printex: 35, U, V, 140U, 140V, Special Black: 6, 5, 4A, 4 (Degussa GmbH); and No. 25, No. 33, No. 40, No. 47, No. 52, No. 900, No. 2300, MCF-88, MA 600, MA 7, MA 8, MA 100 (Mitsubishi Chemical Corp.).

Further, carbon blacks newly otherwise prepared for the present invention can be used. Moreover, not limited to carbon blacks, magnetic microparticles such as magnetite and ferrite, titanium black and the like may be used.

Organic Pigment

Coloring materials used for a pigment ink other than a black ink include various types of organic pigments. The following organic pigments are usable. The present invention is of course not limited thereto.

They include water-insoluble azo pigments such as toluidine red, toluidine maroon, Hansa yellow, benzidine yellow and pyrazolone red, water-soluble azo pigments such as Litol red, helio bordeaux, pigment scarlet and permanent red 2B, derivatives from vat dyes such as alizarin, andanthrone and thioindigo maroon, phthalocyanine pigments such as phthalocyanine blue and phthalocyanine green, quinacridone pigments such as quinacridone red and quinacridone magenta, perylene pigments such as perylene red and perylene scarlet, isoindolinone pigments such as isoindolinone yellow and isoindolinone orange, imidazolone pigments such as benzimidazolone yellow, benzimidazolone orange and benzimidazolone red, pyranthrone pigments such as pyranthrone red and pyranthrone orange, indigo pigments, condensed azo pigments, thioindigo pigments, diketopyrrolopyrrole pigments, fravanthrone yellow, acylamide yellow, quinophthalone yellow, nickel azo yellow, copper azomethine yellow, perinone orange, anthrone orange, dianthraquinonyl red, and dioxazine violet.

If organic pigments usable in the present invention are represented as color index (COLOUR INDEX) numbers, the following are listed. They include C. I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, etc.; C. I. Pigment Orange: 16, 36, 43, 51, 55, 59, 61, 71, etc.; C. I. Pigment Red: 9, 48, 49, 52, 53, 57, 97, 122, 123, 149, 168, 175, 176, 177, 180, 192, etc.; further, C. I. Pigment Red: 215, 216, 217, 220, 223, 224, 226, 227, 228, 238, 240, 254, 255, 272, etc.; C. I. Pigment Violet: 19, 23, 29, 30, 37, 40, 50, etc.; C. I. Pigment Blue: 15, 15:1, 15:3, 15:4, 15:6, 22, 60, 64, etc.; C. I. Pigment Green: 7, 36, etc.; and C. I. Pigment Brown: 23, 25, 26, etc.

The content (mass %) of a pigment in a pigment ink can be 0.1 mass % or more and 15.0 mass % or less, and further can be 1.0 mass % or more and 10.0 mass % or less with respect to the total mass of the ink.

(Salt)

A pigment ink further containing a salt allows to form images having a very high optical density without large changes of the image quality depending on the kind of a recording medium. The form of a salt in a pigment ink may be any of forms in which part of the salt is dissociated, or in which the salt is completely dissociated.

Specific examples of salts usable for a pigment ink include $(M_2)NO_3$, $CH_3COO(M_2)$, $C_6H_5COO(M_2)$, $C_2H_4(COO(M_2))_2$, $C_6H_4(COO(M_2))_2$ and $(M_2)_2SO_4$. Wherein, $M_2$ is an alkali metal, ammonium or organic ammonium. The present invention is of course not limited thereto.

The content (mass %) of a salt in a pigment ink can be 0.05 mass % or more and 10.0 mass % or less with respect to the total mass of the ink. With the content below 0.05 mass %, the above-mentioned effect sometimes cannot be obtained, and with the content above 10.0 mass %, the storage stability and the like of the ink sometimes cannot be obtained.

The case where the $M_2$ is ammonium is preferable because a more excellent water resistance is obtained. Among them, especially $NH_4NO_3$, $C_2H_4(COONH_4)_2$, $C_6H_4(COONH_4)_2$, $(NH_4)_2SO_4$ and the like are preferable because they exhibit the water resistance in a relatively short time. The case where the salt is $C_2H_4(COO(M_2))_2$, $C_6H_4(COO(M_2))_2$, or $(M_2)_2SO_4$ is more preferable because the dispersion stability of the pigment is particularly excellent even when the moisture in an ink is evaporated during the storage time and the like. In a self-dispersion pigment in which an $-R-(COO(M_1))_n$ group is bonded to the surface of the pigment particles, for example, in the case of n=2, a salt used in combination with the self-dispersion pigment can be a divalent salt. That is, the case where the valence number of functional groups on the pigment particle surface and that of the salt are equal is especially preferable because the advantage of the present invention is more remarkably obtained. Specific combinations include those between a self-dispersion pigment in which the $-R-(COO(M_1))_2$ group is bonded to the surface of pigment particles, and a salt of $C_2H_4(COO(M_2))_2$, $C_6H_4(COO(M_2))_2$ or $(M_2)_2SO_4$. The present invention is of course not limited thereto.

(Aqueous Medium)

A pigment ink is obtained by dispersing a coloring material described above in water or an aqueous medium of a mixed solvent of water and a water-soluble organic solvent (s). Water can be a deionized water (ion exchange water). The content (mass %) of water in a pigment ink can be 50.0 mass % or more and 95.0 mass % or less with respect to the total mass of the ink. The water-soluble organic solvent(s) can be that having the effect of preventing drying of the ink. The content (mass %) of a water-soluble organic solvent(s) in a pigment ink can be 3.0 mass % or more and 50.0 mass % or less with respect to the total mass of the ink.

Specific examples of water-soluble organic solvents to be used are as follows. These water-soluble organic solvents may be used singly or as a mixture thereof. They include alkyl alcohols having 1 to 4 carbon atoms such as methanol, ethanol, n-propanol, isopropanol, n-butanol, isobutanol, secondary butanol and tertiary butanol, amides such as dimethylformamide and dimethylacetamide, ketones and ketoalcohols such as acetone and diacetone alcohol, ethers such as tetrahydrofuran and dioxane, polyalkylene glycols such as polyethylene glycol and polypropylene glycol, glycols such as ethylene glycol, propylene glycol, butylene glycol, triethylene glycol, hexylene glycol and diethylene glycol, alkylene glycols containing an alkylene group having 2 to 6 carbon atoms such as 1,2,6-hexanetriol and thiodiglycol, alkyl ether acetates such as polyethylene glycol monomethyl ether acetate, glycerin, alkyl ethers of polyhydric alcohols such as ethylene glycol monomethyl(or ethyl)ether, diethylene glycol methyl(or ethyl)ether and triethylene glycol monomethyl (or ethyl)ether, N-methyl-2-pyrrolidone, 2-pyrrolidone, and 1,3-dimethyl-2-imidazolidinone.

<Other Inks>

A reactive ink can be used further in combination with another ink other than the pigment ink described above. The another ink in the present invention includes, for example, an ink (nonreactive ink) not containing a polyvalent metal and the like, i.e., not reactive with a pigment ink. The nonreactive ink can have the same constitution as ordinary ink jet inks, and can contain specifically at least a coloring material, water and a water-soluble organic solvent(s).

<Ink Jet Recording Method>

The reactive ink and the pigment ink described above can especially be applied to the ink jet recording method whereby recording is performed by ejecting an ink by an ink jet method. The ink jet recording method involves one in which an ink is ejected by acting the mechanical energy on the ink and one in which an ink is ejected by acting the thermal energy on the ink. Particularly, in the present invention, the ink jet recording method utilizing the thermal energy can be used.

<Image Forming Method>

The ink according to the present invention can be applied to an image forming method in which images formed with the reactive ink described above and images formed with the pigment ink described above adjoin each other to form images. A constitution to apply the reactive ink on an area where an image is formed with the pigment ink before or after applying the pigment ink, can be configured as follows. That is, when the pigment ink and the reactive ink contact and mix with each other on a recording medium, the dispersion state of the pigment in the pigment ink can be destabilized.

<Ink Set>

The ink according to the present invention can be applied to an ink set having a plurality of inks. Particularly, an ink set can be made to have the reactive ink and the pigment ink described above.

An ink set includes not only a monolithic ink cartridge formed of a plurality of ink cartridges, but also a combination of a plurality of individual ink cartridges, and further an integral type of the ink cartridge(s) and a recording head.

Cases where the ink cartridge is used in combination as follows are included as examples of ink sets of the present invention. The cases involve one in which the ink cartridge is used in combination with an ink cartridge accommodating another black ink and further one where the ink cartridge is used in combination with an ink cartridge into which respective ink cartridges accommodating a black ink, a light cyan ink and a light magenta ink are unified.

Specific examples of ink sets of a case where a plurality of single ink cartridges is used in combination include the following forms. They include a case where respective independent ink cartridges accommodating a cyan ink, a magenta ink and a yellow ink and further another ink cartridge accommodating a black ink are used in combination, a case where respective ink cartridges accommodating a black ink, a light cyan ink and a light magenta ink are used in combination, a case where a single ink cartridge accommodating a red ink is additionally used, and a case where a single ink cartridge accommodating a green ink is additionally used.

Particularly, the form of an ink set which is used in combination of a single ink cartridge and another ink cartridge accommodating a black ink is preferable.

<Ink Cartridge>

An ink cartridge suitable to perform the ink jet recording using the reactive ink and the pigment ink described above includes an ink cartridge equipped with ink storage portions to store these inks. Hereinafter, specific examples of ink cartridges will be described.

FIG. 1 is an illustrative view of an ink cartridge. In FIG. 1, the ink cartridge communicates with the air through an air communication port 112 at the upper part thereof, and communicates with an ink supply port at the lower part thereof. The ink cartridge has inside thereof a structure in which a negative pressure generation member-holding chamber 134 to contain a negative pressure generation member and a liquid storage chamber 136 which contains a liquid ink and is substantially hermetically sealed are partitioned by a partition wall 138. The negative pressure generation member-holding chamber 134 and the liquid storage chamber 136 communicate with each other only through a communication hole 140 formed in the partition wall 138 near the bottom of the ink cartridge and an air introduction groove (air introduction path) 150 to promote the introduction of the air into the liquid storage chamber at the liquid supply operation time. A plurality of ribs is integrally molded in the form of internally projecting on the upper wall of the ink cartridge in which the negative pressure generation member-holding chamber 134 is formed and abuts on the negative pressure generation member contained in a compression state in the negative pressure generation member-holding chamber 134. An air buffer chamber is formed between the upper wall and the upper surface of the negative pressure generation member by these ribs. An ink supply cylinder equipped with a liquid supply port 114 is provided with a pressure-contacted body 146 which has a higher capillary force and a higher physical strength than the negative pressure generation member, and pressure-contacted with the negative pressure generation member.

In the negative pressure generation member compartment 134, two capillary-force generating type negative pressure generation members of a first negative pressure generation member 132B and a second negative pressure generation member 132A composed of fibers of an olefin resin such as polyethylene, is contained. The crossing part of a boundary layer 132C between the two negative pressure generation members and the partition wall 138 is present above the upper end of the air introduction groove (air introduction path) 150 when the ink cartridge is orientated as if it is used so that the communication hole is located downward. An ink contained in the negative pressure generation member is present up to above the boundary layer 132C as shown by a liquid level L of the ink.

Here, the boundary layer between the first negative pressure generation member 132B and the second negative pressure generation member 132A is pressure-contacted, and the vicinity of the boundary layer of the negative pressure generation member has a higher compressibility and a stronger capillary force than other portions. Specifically, when P1 refers to the capillary force of the first negative pressure generation member 132B; P2 refers to the capillary force of the second negative pressure generation member 132A; and PS refers to the capillary force of the interface between the negative pressure generation members, the relation therebetween is P2<P1<PS.

Figure 2:
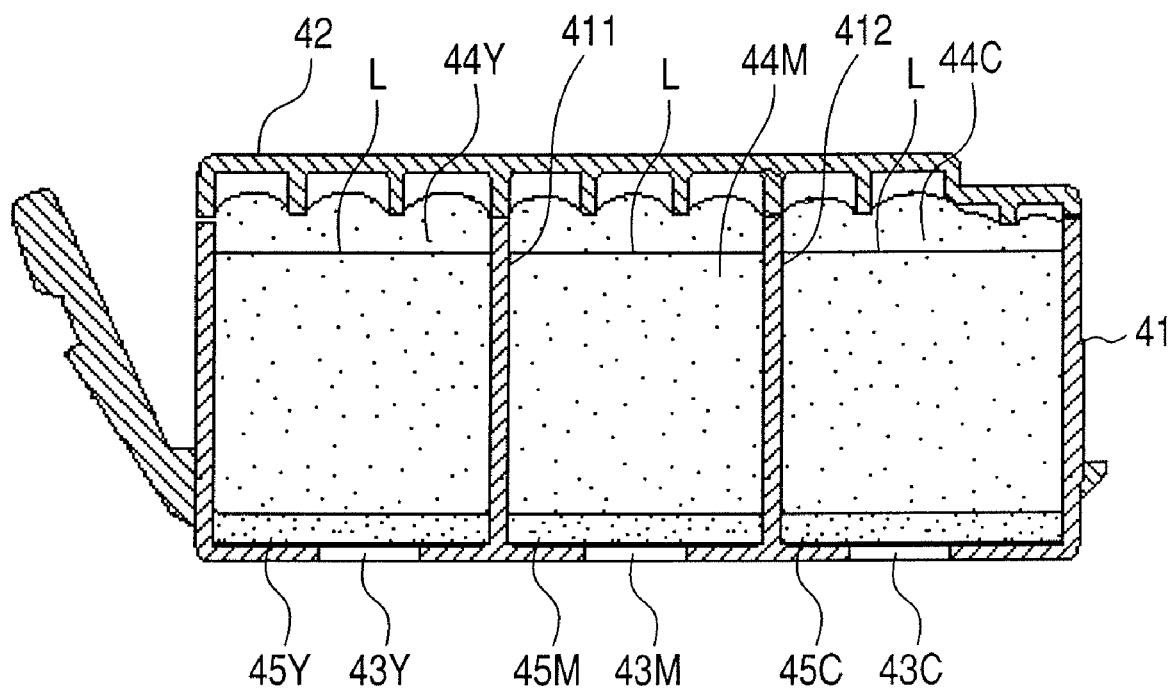
FIG. 2 is an illustrative view of an ink cartridge.

FIG. 2 is an illustrative view of another form of an ink cartridge. The ink cartridge having the form shown in FIG. 2 has a container 41 containing inks of three colors of yellow (Y), magenta (M) and cyan (C), and a lid member 42 to cover the container 41. The ink cartridge has a yellow-ink supply port 43Y, a magenta-ink supply port 43M and a cyan-ink supply port 43 C for the respective inks of yellow, magenta and cyan. The interior of the container 41 is partitioned, for containing inks of the three colors, into three spaces whose capacities are almost equal by two partitions 411 and 412 which are arranged parallel with each other. These three spaces line up along the inserting direction of the ink cartridge when the ink cartridge is loaded on an ink cartridge holder. These three spaces contain an ink absorbing body 44Y to absorb and hold the ink of yellow, an ink absorbing body 44M to absorb and hold the ink of magenta and an ink absorbing body 44C to absorb and hold the ink of cyan, respectively. Further, ink supply members 45Y, 45M and 45C to supply the inks to the ink supply ports are contained contacting with the lower parts of the ink absorbing bodies, respectively. The inks contained in the ink absorbing bodies 44Y, 44M and 44C, which are negative pressure generation members, are present up to upper parts of the ink absorbing bodies as shown by liquid levels L of the inks, respectively.

Figure 3:
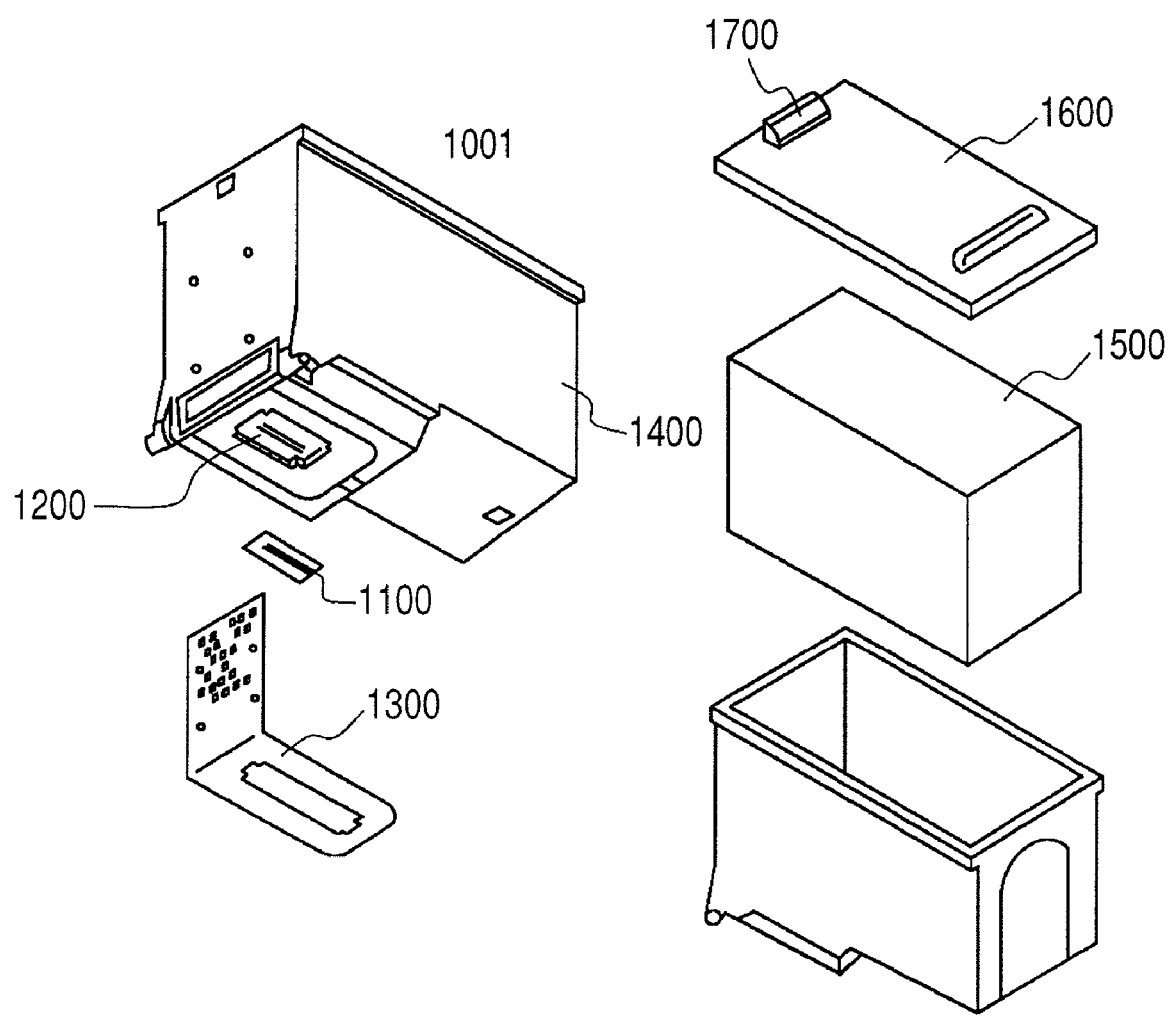
FIG. 3 is an exploded view of a recording head.

FIG. 3 is an exploded view of a recording head which has a unified constitution with an ink cartridge. When the recording head is used, an ink cartridge in which differences in the evaporation amount from liquid chambers of each ink constituting an ink set are substantially equal can be used. "Differences in the evaporation amount from liquid chambers of each ink constituting an ink set are substantially equal" means, for example, that when the evaporation rate from each liquid chamber which is made to contain water is measured, the differences in the evaporation rate are not more than about 1%.

A recording head 1001 illustrated in FIG. 3 is supported and fixed by a positioning unit and electric contacts of a carriage mounted on an ink jet recording apparatus body. The recording head 1001 is attachable to/detachable from the carriage, and replaced when a loaded ink has been consumed.

The recording head 1001 is to jet inks, and has a recording element substrate 1100 on which ink supply ports are formed in line and an electric wiring tape 1300 which forms electric signal paths to apply electric signals to jet inks. Further, the interior thereof includes an ink supply/hold member 1400 which is formed by resin molding, an ink absorbing body 1500 to generate a negative pressure to hold inks, and a lid member 1600.

The ink supply/hold member 1400 is equipped with a function as an ink cartridge and the ink supply function. Specifically, that the interior thereof has a space which holds the absorbing body 1500 to generate a negative pressure to hold inks of cyan, magenta and yellow provides a function as an ink cartridge. Further, that independent ink flow paths are formed to introduce inks to the ink supply ports of the recording element substrate 1100 provides the ink supply function. An ink supply port 1200 is formed downstream of the ink flow paths to supply inks to the recording element substrate 1100. The recording element substrate 1100 is fixed to the ink supply/hold member 1400 such that the ink supply ports of the recording element substrate 1100 communicate with the ink supply port 1200 of the ink supply/hold member 1400. The back surface of part of the electric wiring tape 1300 is fixed on the plane in the surrounding vicinity of the ink supply port 1200. The lid member 1600 is welded to the upper opening of the ink supply/hold member 1400 so that the interior space of the ink supply/hold member 1400 is hermetically sealed. The lid member 1600 has engagement parts 1700 to fix the recording head to the ink jet recording apparatus.

Figure 4:
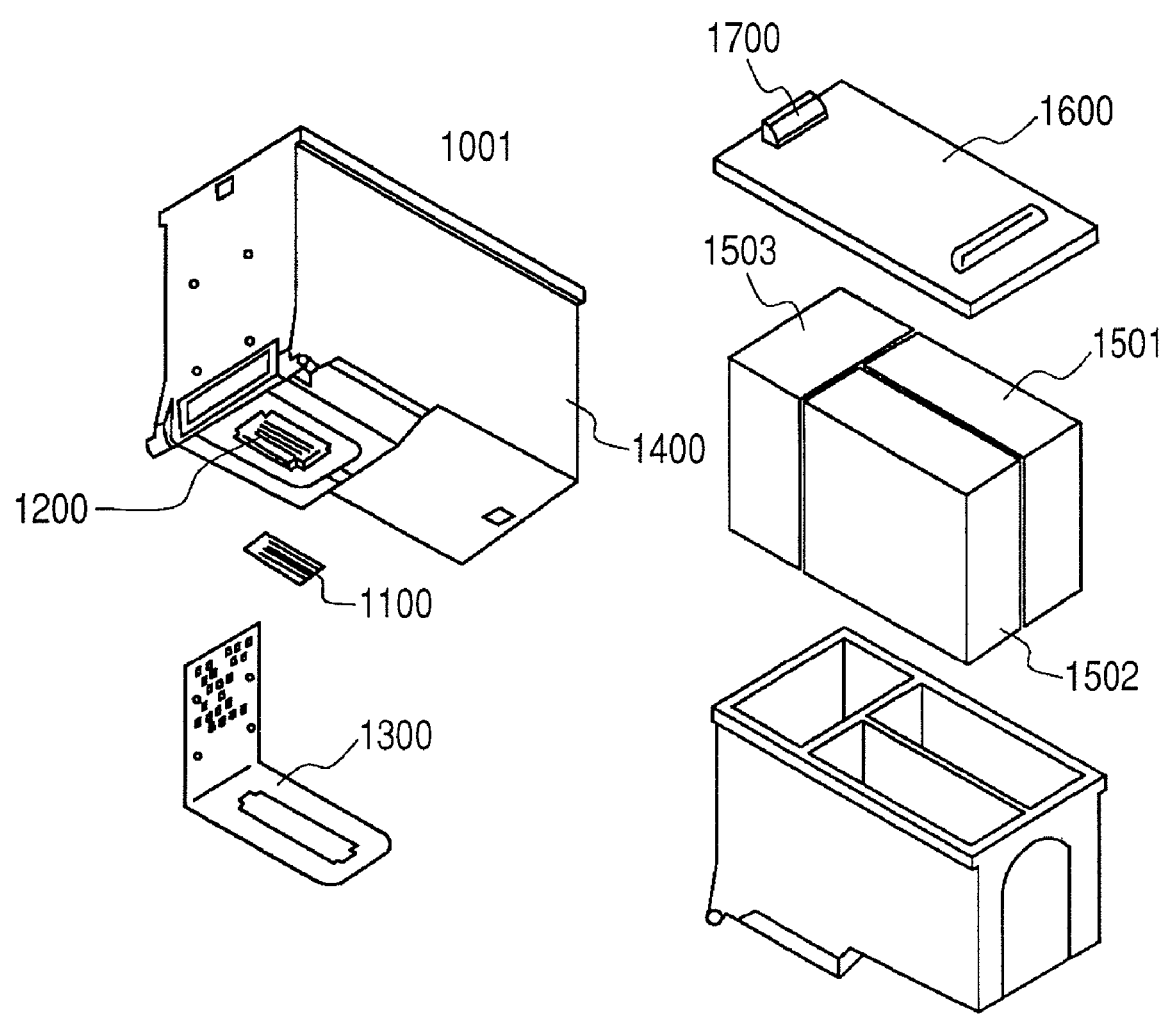
FIG. 4 is an exploded view of a recording head.

FIG. 4 is an exploded view of a recording head as another example usable in the present invention. The recording head illustrated in FIG. 4 is unified with an ink cartridge as in FIG. 3. A recording head 1001 is loaded with a plurality of inks of different colors (for example, cyan ink, magenta ink, yellow ink), and when a loaded ink has been consumed, it is replaced.

The recording head 1001 is to jet a plurality of inks of different colors (for example, cyan ink, magenta ink, yellow ink), and includes a recording element substrate 1100 on which ink supply ports for cyan, magenta and yellow are formed in line, and the like. An ink supply/hold member 1400 is equipped with a function as an ink cartridge and the ink supply function. Specifically, that the interior thereof has spaces which independently hold absorbing bodies 1501, 1502, 1503 to generate a negative pressure to hold inks of cyan, magenta and yellow provides a function as an ink cartridge. Further, that independent ink flow paths are formed to introduce inks to the ink supply ports of the recording element substrate 1100 provides the ink supply function.

EXAMPLES

Hereinafter, the present invention will be in detail described by way of examples and comparative examples, but is not any more limited to the following examples unless departing from the spirit and the scope of the present invention. Unless otherwise specified, the ink components of examples and comparative examples represent "parts by mass".

Examples 1 to 5, Comparative Examples 1 to 6 and Reference Examples 1 to 5

Synthesis of a Coloring Material A

Synthesis of Tetrasodium Copper Phthalocyanine Tetrasulfonate (Compound (2)):

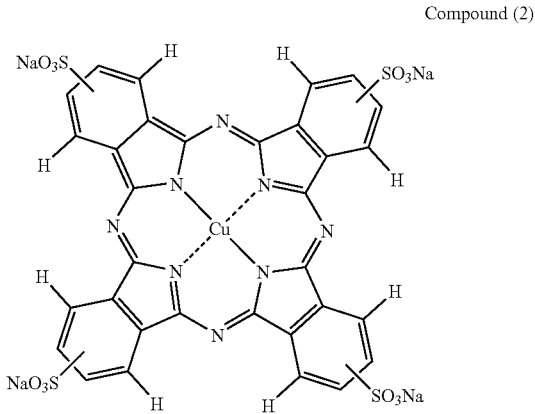

Compound (2)

Sulfolane, monosodium 4-sulfophthalate, ammonium chloride, urea, ammonium molybdate, and copper (II) chloride were mixed and agitated, and then washed with methanol. Thereafter, the mixture was added with water and the pH of the resultant solution was adjusted to 11 using a sodium hydroxide aqueous solution. The obtained solution was added with a hydrochloric acid aqueous solution under agitation and further little by little with sodium chloride to deposit crystals. The obtained crystals were filtered; the filtered crystals were washed with a 20%-sodium chloride aqueous solution; the washed crystals were then added with methanol; and deposited crystals were filtered. The obtained crystals were washed with a 70%-methanol aqueous solution, and then dried to obtain Compound (2), tetrasodium copper phthalocyanine tetrasulfonate, as blue crystals.

Synthesis of Copper Phthalocyanine Tetrasulfonyl Chloride (Compound (3)):

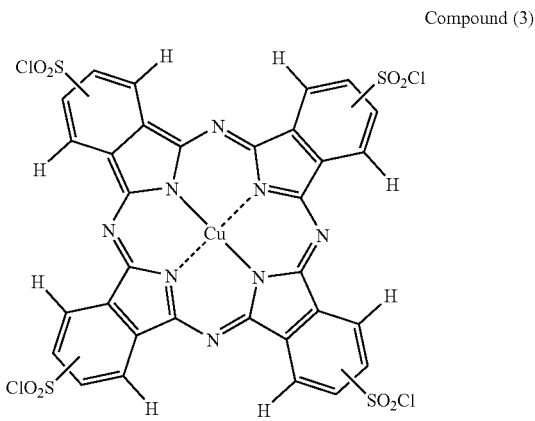

Compound (3)

The tetrasodium copper phthalocyanine tetrasulfonate obtained as described above was little by little added to sulfonyl chloride, and further dropwise added with thionyl chloride to be allowed to react. Thereafter, the reaction liquid was cooled and deposited crystals were filtered to obtain a wet cake of copper phthalocyanine tetrasulfonyl chloride.

Synthesis of a Compound Represented by the Following Compound (4):

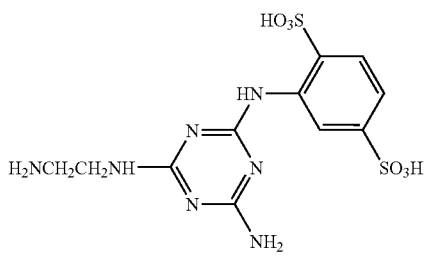

Compound (4) is a compound wherein, in the general formula (III), Y is an amino group; and $R_1$ and $R_2$ are substituted sulfonate groups on the 2-position and 5-position.

Lipal OH, cyanuric chloride and monosodium aniline-2,5-disulfonate were added to ice water, and were allowed to react while added with a sodium hydroxide aqueous solution. Then, the reaction liquid was added with a sodium hydroxide aqueous solution, and the pH of the reaction solution was adjusted to 10. This reaction liquid was added with a 28% aqueous ammonia and ethylenediamine and was allowed to react. The obtained reaction liquid was dropwise added with sodium chloride and a concentrated hydrochloric acid to deposit crystals. The deposited crystals were filtered and isolated, and washed with a 20%-sodium chloride aqueous solution to obtain a wet cake. The obtained wet cake was added with methanol and water, further filtered, washed with methanol, and then dried to obtain a compound represented by Compound (4).

Synthesis of Coloring Materials A to C

The wet cake of the copper phthalocyanine tetrasulfonyl chloride (Compound (3)) obtained in (2) was added to ice water, agitated and suspended, further added with an aqueous ammonia and Compound (4) obtained in (3), and allowed to react. The resultant was added with water and sodium chloride to deposit crystals. The obtained crystals were filtered, washed with a sodium chloride aqueous solution, again filtered, then washed and dried to obtain a coloring material A as blue crystals. From the reaction described above, the compound is presumed to be a coloring material represented by the exemplified Compound (1), and a coloring material represented by the general formula (I) wherein the average numbers of substituents are in the range of l=1.0 to 1.5, m=1.0 to 1.5 and n=2.0 to 2.5.

Coloring materials B and C were synthesized according to a synthesis flow similar to the above one which were compounds represented by the exemplified Compound (1) wherein the average numbers of substituents in the general formula (I) were different from each other. The average numbers of substituents in the coloring materials A to C are shown in the following Table 1.

TABLE 1

| Coloring material | l | m | n |
|---|---|---|---|
| A | 1.0-1.5 | 1.0-1.5 | 2.0-2.5 |
| B | 0 | 1.5-2.5 | 1.5-2.5 |
| C | 1.0-1.5 | 1.0-1.5 | 1.5-2.0 |

(Measurement of Specific Dielectric Constants of Water-Soluble Organic Solvents)

The specific dielectric constants of various water-soluble organic solvents used for preparation of reactive inks were measured under conditions of a temperature of 20° C. and a measurement frequency of 10 kHz using a portable dielectric constant meter BI-870 (Brookhaven Instrument Corp.). The results are shown in Table 2. Here, since ethyleneurea and 1,6-hexanediol are solids at 20° C., they do not correspond to water-soluble organic solvents having a specific dielectric constant at 20° C. of 10.0 or more and less than 30.0 in the present invention.

TABLE 2

| | Specific dielectric constant |
|---|---|
| Ethylene glycol | 38.1 |
| Glycerin | 43.0 |
| Polyethylene glycol 200 (*1) | 19.5 |
| 2-pyrrolidone | 27.5 |
| 1,2,6-hexanetriol | 28.5 |
| Isopropyl alcohol | 18.3 |
| Acetylenol E100 (*2) | 8.2 |

(*1) Average molecular weight: 200
(*2) Acetylene glycol ethylene oxide adduct (surfactant: Kawaken Fine Chemicals Co., Ltd.)

(Preparation of Reactive Inks)

The components shown in Table 3-1, Table 3-2 and Table 3-3 shown below were mixed, respectively, fully agitated, and then pressure-filtered with a membrane filter of a pore size of 0.2 μm to prepare respective reactive inks. In Table 3-1, Table 3-2 and Table 3-3, the $d_{75}$ values were measured as follows.

(Measurement of $d_{75}$ Value)

Each reactive ink was diluted with a pure water such that the concentration of the corresponding coloring material was 0.5 mass %, and then the $d_{75}$ value was measured by the small angle X-ray scattering method. The measurement conditions of the $d_{75}$ value are as follows.

Apparatus: Nano Viewer (manufactured by Rigaku)
X-ray source: Cu—Kα
Output: 45 kV-60 mA
Effective focal spot: 0.3 mmφ+Confocal Max-Flux Mirror
$1^{st}$ Slit: 0.5 mm, $2^{nd}$ Slit: 0.4 mm, $3^{rd}$ Slit: 0.8 mm
Irradiation time: 360 min
Beam stopper: 3.0 mmφ
Measurement method: Penetration method
Detector: Blue Imaging Plate A peak area obtained by removing a background and a 2θ value corresponding to 75% or more of the entire peak area ($2\theta_{75}$ value) were measured from the resultant scattering angle profile by means of an X-ray diffraction data processing soft JADE (Material Data, Inc.). The $d_{75}$ value was calculated from the $2\theta_{75}$ value on the basis of the following equation (2):

$$d_{75} = \lambda/2 \cdot \sin\theta_{75} \qquad \text{Equation (2).}$$

The results are shown in Table 3-1, Table 3-2 and Table 3-3.

TABLE 3-1

| | Example | | | | |
|---|---|---|---|---|---|
| | 1 | 2 | 3 | 4 | 5 |
| Coloring material A | 6.0 | 6.0 | | | 6.0 |
| Coloring material B | | | 6.0 | 6.0 | |
| Coloring material C | | | | | |
| Magnesium nitrate | 1.9 | 2.0 | 10.0 | 5.0 | 2.0 |
| Ethyleneurea | 10.0 | 10.0 | 10.0 | 10.0 | 10.0 |
| 1,6-hexanediol | 8.0 | 8.0 | 8.0 | 8.0 | 8.0 |
| Ethylene glycol | 5.5 | 5.5 | 3.5 | | 3.5 |
| Glycerin | | | | | |
| Polyethylene glycol 200 (*1) | 4.0 | 4.0 | 6.0 | 3.0 | 3.0 |
| 2-pyrrolidone | | | 8.0 | 3.0 | 2.5 |
| 1,2,6-hexanetriol | 4.0 | 4.0 | 6.0 | | |
| Isopropyl alcohol | 2.5 | 2.5 | 2.5 | 2.0 | 2.0 |
| Acetylenol E100 (*2) | 1.0 | 1.0 | 1.0 | 0.5 | 0.5 |
| Pure water | 57.1 | 57.0 | 39.0 | 62.5 | 62.5 |
| Content of a polyvalent metal [mol/g] | $7.4 \times 10^{-5}$ | $7.8 \times 10^{-5}$ | $3.9 \times 10^{-4}$ | $2.0 \times 10^{-4}$ | $7.8 \times 10^{-5}$ |
| Total content A of a water-soluble organic solvent(s) (*3) | 35.0 | 35.0 | 45.0 | 26.5 | 29.5 |
| Content B of a specific water-soluble organic solvent(s) (*4) | 10.5 | 10.5 | 22.5 | 8.0 | 7.5 |
| B/A [%] (*5) | 30.0 | 30.0 | 50.0 | 30.2 | 25.4 |
| $d_{75}$ value [nm] | 8.30 | 8.50 | 12.40 | 12.60 | 8.60 |

(*1) Average molecular weight: 200
(*2) Acetylene glycol ethylene oxide adduct (surfactant: Kawaken Fine Chemicals Co., Ltd.)
(*3) The total content A (mass %) of a water-soluble organic solvent(s) in an ink except a polyvalent metal
(*4) The content B (mass %) of a water-soluble organic solvent(s) having a specific dielectric constant of 10.0 or more and less than 30.0 at 20° C.
(*5) The ratio (%) of the content B to the total content A

TABLE 3-2

| | Comparative Example | | | | | |
|---|---|---|---|---|---|---|
| | 1 | 2 | 3 | 4 | 5 | 6 |
| Coloring material A | 6.0 | | 6.0 | | | |
| Coloring material B | | 6.0 | | 6.0 | 6.0 | 6.0 |
| Coloring material C | | | | | | |
| Magnesium nitrate | 0.04 | 11.0 | 2.0 | 10.0 | 10.0 | 10.0 |
| Ethyleneurea | 10.0 | | 10.0 | 10.0 | 5.0 | 8.0 |
| 1,6-hexanediol | 8.0 | | 6.0 | 8.0 | | |
| Ethylene glycol | 5.5 | | 4.5 | 4.0 | | |
| Glycerin | 4.0 | | | | 4.0 | 4.0 |
| Polyethylene glycol 200 (*1) | | 15.0 | | 5.0 | | |
| 2-pyrrolidone | | 20.0 | 2.0 | | 4.0 | 4.0 |
| 1,2,6-hexanetriol | | 10.0 | | | | |
| Isopropyl alcohol | 2.0 | 3.0 | 1.3 | 3.0 | | |
| Acetylenol E100 (*2) | 0.5 | 1.0 | 0.5 | 0.5 | 1.0 | 1.0 |
| Pure water | 63.96 | 34.0 | 67.7 | 53.5 | 70.0 | 67.0 |
| Content of a polyvalent metal [mol/g] | $1.6 \times 10^{-6}$ | $4.3 \times 10^{-4}$ | $7.8 \times 10^{-5}$ | $3.9 \times 10^{-4}$ | $3.9 \times 10^{-4}$ | $3.9 \times 10^{-4}$ |
| Total content A of a water-soluble organic solvent(s) (*3) | 30.0 | 49.0 | 24.3 | 30.5 | 14.0 | 17.0 |
| Content B of a specific water-soluble organic solvent(s) (*4) | 2.0 | 48.0 | 3.3 | 8.0 | 4.0 | 4.0 |

TABLE 3-2-continued

| | Comparative Example | | | | | |
|---|---|---|---|---|---|---|
| | 1 | 2 | 3 | 4 | 5 | 6 |
| B/A [%] (*5) | 6.7 | 98.0 | 13.6 | 26.2 | 28.6 | 23.5 |
| $d_{75}$ value [nm] | 6.90 | 13.50 | 9.10 | 12.70 | 13.75 | 13.82 |

(*1) Average molecular weight: 200
(*2) Acetylene glycol ethylene oxide adduct (surfactant: Kawaken Fine Chemicals Co., Ltd.)
(*3) The total content A (mass %) of a water-soluble organic solvent(s) in an ink except a polyvalent metal
(*4) The content B (mass %) of a water-soluble organic solvent(s) having a specific dielectric constant of 10.0 or more and less than 30.0 at 20° C.
(*5) The ratio (%) of the content B to the total content A

TABLE 3-3

| | Reference Example | | | | |
|---|---|---|---|---|---|
| | 1 | 2 | 3 | 4 | 5 |
| Coloring material A | 6.0 | 6.0 | 6.0 | 6.0 | 6.0 |
| Coloring material B | | | | | |
| Coloring material C | | | | | |
| Magnesium nitrate | 0.05 | 2.0 | | 2.0 | |
| Ethyleneurea | 10.0 | 10.0 | 10.0 | 5.0 | 10.0 |
| 1,6-hexanediol | 8.0 | 6.0 | | | |
| Ethylene glycol | 5.5 | 4.7 | 8.0 | | 6.0 |
| Glycerin | 4.0 | | 4.0 | | 4.0 |
| Polyethylene glycol 200 (*1) | | | | 4.0 | |
| 2-pyrrolidone | | 2.5 | 2.5 | 5.0 | 5.0 |
| 1,2,6-hexanetriol | | | | 2.0 | 2.0 |
| Isopropyl alcohol | 2.0 | 1.3 | | | 2.0 |
| Acetylenol E100 (*2) | 0.5 | 0.5 | 1.0 | 0.5 | 1.0 |
| Pure water | 63.95 | 67.0 | 68.5 | 75.5 | 64.0 |
| Content of a polyvalent metal [mol/g] | $2.0 \times 10^{-6}$ | $7.8 \times 10^{-5}$ | 0.0 | $7.8 \times 10^{-5}$ | 0.0 |
| Total content A of a water-soluble organic solvent(s) (*3) | 30.0 | 25.0 | 25.5 | 16.5 | 30.0 |
| Content B of a specific water-soluble organic solvent(s) (*4) | 2.0 | 3.8 | 2.5 | 11.0 | 9.0 |
| B/A [%] (*5) | 6.7 | 15.2 | 9.8 | 66.7 | 30.0 |
| $d_{75}$ value [nm] | 6.90 | 8.90 | 6.75 | 8.95 | 6.70 |

(*1) Average molecular weight: 200
(*2) Acetylene glycol ethylene oxide adduct (surfactant: Kawaken Fine Chemicals Co., Ltd.)
(*3) The total content A (mass %) of a water-soluble organic solvent(s) in an ink except a polyvalent metal
(*4) The content B (mass %) of a water-soluble organic solvent(s) having a specific dielectric constant of 10.0 or more and less than 30.0 at 20° C.
(*5) The ratio (%) of the content B to the total content A (Preparation of a Pigment Dispersion)

A solution of 5 g of a concentrated hydrochloric acid in 5.5 g of water was cooled at 5° C. and combined with 1.5 g of 4-amino-1,2-benzenedicarboxylic acid. Next, the vessel charged with the resultant solution was put in an ice bath; and the solution was agitated to keep the temperature of the solution always at 10° C. or less and added with a solution obtained by dissolving 1.8 g of sodium nitrite in 9 g of water of 5° C. The resultant solution was further agitated for 15 min and then added with 6 g of a carbon black whose specific surface area was 220 m$^2$/g and whose DBP oil absorption was 105 mL/100 g under agitation. Thereafter, the resultant solution was further agitated for 15 min. The obtained slurry was filtered with a filter paper (trade name: Standard Filter Paper No. 2: Advantech Co., Ltd.); the particles were fully washed with water; and the washed particles were dried in an oven of 110° C. to prepare a self-dispersion carbon black 1. Further, the self-dispersion carbon black 1 was added with water and dispersed such that the content of the pigment was 10 mass %, to prepare a dispersion liquid. By the method described above, a pigment dispersion 1 was obtained in which a self-dispersion carbon black in which the —$C_6H_3$—(COONa)$_2$ groups were incorporated on the surface of the carbon black particles was dispersed in water.

Further, sodium ions in the pigment dispersion 1 obtained as described above were replaced with ammonium ions by the ion exchange method to prepare a self-dispersion carbon black 2. Further, the obtained self-dispersion carbon black 2 was added with water such that the content of the pigment was 10 mass %, to prepare a dispersion liquid. By the method described above, a pigment dispersion was obtained in which a self-dispersion carbon black in which the —$C_6H_3$—(COONH$_4$)$_2$ groups were incorporated on the surface of the carbon black particles was dispersed in water.

The ionic group density of the self-dispersion carbon black 2 prepared as described above was 3.1 μmol/m$^2$. The measurement method of the ionic group density used here involved measurement of the ammonium ion content of the pigment dispersion prepared as described above by using Ion Meter (DKK-TOA Corp.), and the ionic group density of the self-dispersion carbon black was converted into from the measurement.

(Preparation of a Pigment Ink)

The components shown in Table 4 below were mixed, fully agitated, and thereafter pressure-filtered with a microfilter of a pore size of 3.0 μm to prepare a pigment ink.

TABLE 4

| | Pigment ink |
|---|---|
| Pigment dispersion | 35.00 |
| Glycerin | 6.00 |
| Diethylene glycol | 5.00 |
| 2-pyrrolidone | 5.00 |
| Trimethylolpropane | 4.00 |
| Acetylenol E100 (*1) | 0.15 |
| Ammonium sulfate | 0.33 |
| Pure water | 44.52 |

(*1) Acetylene glycol ethylene oxide adduct (surfactant: Kawaken Fine Chemicals Co., Ltd.)

(Evaluation)

Bronzing Resistance

The each reactive ink obtained above was filled in an ink cartridge for an ink jet recording apparatus (trade name:

PIXUS9501; Canon Inc.). The obtained ink cartridge was loaded on a remodeled ink jet recording apparatus (trade name: PIXUS9501; Canon Inc.). Then, images whose recording duty was varied at intervals of 10% between from 10% to 100% were formed on Professional Photo Paper PR-101 (Canon Inc.). The degree of occurrence of the bronzing phenomenon in parts where the recording duty was 30% in the obtained images was visually confirmed. The standard to evaluate bronzing resistance is as follows. The evaluation results are shown in Table 5.

AA: No bronzing phenomenon occurs.
A: Almost no bronzing phenomenon occurs.
B: Bronzing phenomenon slightly occurs.
C: Bronzing phenomenon obviously occurs.

Bleeding Resistance

The each reactive ink and the pigment ink obtained above, respectively, were filled in ink cartridges for an ink jet recording apparatus (trade name: iP3100; Canon Inc.). The obtained ink cartridges were loaded on a remodeled ink jet recording apparatus (trade name: iP3100; Canon Inc.) in combination of the each reactive ink and the pigment ink. Then, images in which solid images formed with the reactive ink and solid images formed with the pigment ink adjoin were formed on 4024 (Xerox Corp.). The degree of the bleeding at the boundary of the images formed with the reactive ink and the images formed with the pigment ink was visually observed. The standard of the bleeding resistance is as follows. The evaluation results are shown in Table 5.

AA: No bleeding occurs at all the boundaries.
A: Almost no bleeding occurs.
B: Bleeding slightly occurs, but is at a level of no problem in practical use.
C: Bleeding occurs to such a degree that boundary lines of colors are not clear.

TABLE 5

|  |  | Bronzing resistance | Bleeding resistance |
|---|---|---|---|
| Example | 1 | AA | A |
|  | 2 | A | AA |
|  | 3 | A | AA |
|  | 4 | A | AA |
|  | 5 | A | AA |
| Comparative Example | 1 | AA | B |
|  | 2 | C | AA |
|  | 3 | B | AA |
|  | 4 | C | AA |
|  | 5 | C | AA |
|  | 6 | C | AA |
| Reference Example | 1 | AA | A |
|  | 2 | A | AA |
|  | 3 | AA | — |
|  | 4 | A | AA |
|  | 5 | AA | — |

Examples 6 and 7

Preparation of Reactive Inks and Measurement of $d_{75}$ Values

The components shown in Table 6 below were mixed, fully agitated, and thereafter pressure-filtered with a membrane filter of a pore size of 0.2 μm to prepare reactive inks of Example 6 and Example 7, respectively.

The reactive inks of Example 6 and Example 7 were diluted with pure water such that the coloring material concentrations were 0.5 mass %, and then the $d_{75}$ values were measured by the small angle X-ray scattering method as described above. The results are shown in Table 6.

TABLE 6

|  | Example | |
|---|---|---|
|  | 6 | 7 |
| Coloring material A | 6.0 |  |
| Coloring material B |  |  |
| Coloring material C |  | 6.0 |
| Magnesium nitrate | 2.0 | 0.05 |
| Ethyleneurea | 10.0 | 10.0 |
| 1,6-hexanediol | 8.0 | 8.0 |
| Ethylene glycol |  |  |
| Glycerin |  |  |
| Polyethylene glycol 200 (*1) | 5.0 | 3.0 |
| 2-pyrrolidone | 5.0 |  |
| 1,2,6-hexanetriol |  | 3.0 |
| Isopropyl alcohol | 3.0 | 2.0 |
| Acetylenol E100 (*2) | 0.5 | 0.5 |
| Pure water | 60.5 | 67.45 |
| Content of a polyvalent metal [mol/g] | $7.8 \times 10^{-5}$ | $2.0 \times 10^{-6}$ |
| Total content A of a water-soluble organic solvent(s) (*3) | 31.5 | 26.5 |
| Content B of a water-soluble organic solvent(s) having a particular specific dielectric constant (*4) | 13.0 | 8.0 |
| B/A [%] (*5) | 41.3 | 30.2 |
| $d_{75}$ value [nm] | 6.70 | 6.60 |

(*1) Average molecular weight: 200
(*2) Acetylene glycol ethylene oxide adduct (surfactant: Kawaken Fine Chemicals Co., Ltd.)
(*3) The total content A (mass %) of a water-soluble organic solvent(s) in an ink except a polyvalent metal
(*4) The content B (mass %) of a water-soluble organic solvent(s) having a specific dielectric constant of 10.0 or more and less than 30.0 at 20° C.
(*5) The ratio (%) of the content B to the total content A (Evaluation)

Ozone Resistance

The reactive inks of Example 6 and Example 7 obtained above, respectively, were filled in ink cartridges for an ink jet recording apparatus (trade name: PIXUS9501; Canon Inc.). The obtained ink cartridge was loaded on a remodeled ink jet recording apparatus (trade name: PIXUS9501; Canon Inc.). Then, images whose recording duty was varied at intervals of 10% between from 10% to 100% were formed on Professional Photo Paper PR-101 (Canon Inc.). The optical density of the images at parts where the recording duty was 50% was measured (the measured density was defined as an initial optical density). Further, the images were put in an ozone tester (trade name: OMS-H; Suga Test Instruments Co., Ltd.), and exposed to ozone at an in-chamber temperature of 40° C. at a humidity of 55% in an environment of the ozone gas concentration of 3 ppm for 20 h. Thereafter, the optical density of parts of the images after exposure to ozone where the recording duty was 50% was measured (the measured density was defined as an optical density after ozone-exposure). The measurement of the optical density used a Spectorino (Gretag Macbeth). From the values of the initial optical density and the optical density after ozone-exposure, the residual density ratio was calculated based on the following Equation (3):

Residual density ratio=optical density after ozone-exposure/initial optical density×100(%)    Equation (3).

The standard of the ozone resistance is as follows. The evaluation results are shown in Table 7. In Table 7, results of similar evaluations of the ozone resistances using the reactive inks of Examples 1 to 7 and Reference Examples 1, 2 and 4 and the $d_{75}$ values of the respective reactive inks are also shown.

AA: The residual density ratio is 88% or more.
A: The residual density ratio is 83% or more and less than 88%.
B: The residual density ratio is 80% or more and less than 83%.
C: The residual density ratio is less than 80%.

Bronzing Resistance and Bleeding Resistance

The reactive inks of Examples 6 and 7 and the pigment inks were evaluated for the bronzing resistance and the bleeding resistance by the methods and standards as described above. The evaluation results are shown in Table 8.

TABLE 7

|  |  | $d_{75}$ value | Ozone resistance |
|---|---|---|---|
| Example | 1 | 8.30 | A |
|  | 2 | 8.50 | A |
|  | 3 | 12.40 | AA |
|  | 4 | 12.60 | AA |
|  | 5 | 8.60 | A |
|  | 6 | 6.70 | A |
|  | 7 | 6.60 | B |
| Reference Example | 1 | 6.90 | A |
|  | 2 | 8.90 | A |
|  | 4 | 8.95 | A |

TABLE 8

|  |  | Bronzing resistance | Bleeding resistance |
|---|---|---|---|
| Example | 6 | AA | AA |
|  | 7 | AA | A |

Examples 8 and 9

(Preparation of Reactive Inks and Measurement of $d_{75}$ Values)

The components shown in Table 9 below were mixed, fully agitated, and then pressure-filtered with a membrane filter of a pore size of 0.2 μm to prepare reactive inks of Examples 8 and 9, respectively.

The reactive inks of Examples 8 and 9 were diluted with pure water such that the coloring material concentrations were 0.5 mass %, and then the $d_{75}$ values were measured by the small angle X-ray scattering method as described above. The results are shown in Table 9.

TABLE 9

|  | Example | |
|---|---|---|
|  | 8 | 9 |
| Coloring material A | 6.0 |  |
| Coloring material B |  | 6.0 |
| Coloring material C |  |  |
| Magnesium nitrate | 1.0 | 5.0 |
| Ethyleneurea | 12.0 | 10.0 |
| 1,6-hexanediol | 8.0 | 8.0 |
| Ethylene glycol | 8.0 | 6.0 |

TABLE 9-continued

|  | Example | |
|---|---|---|
|  | 8 | 9 |
| Glycerin | 6.0 | 8.0 |
| Polyethylene glycol 200 (*1) | 5.0 |  |
| 2-pyrrolidone | 5.0 | 10.0 |
| 1,2,6-hexanetriol | 2.0 | 5.0 |
| Isopropyl alcohol | 2.0 | 3.0 |
| Acetylenol E100 (*2) | 1.0 | 1.0 |
| Pure water | 44.0 | 38.0 |
| Content of a polyvalent metal [mol/g] | $3.9 \times 10^{-5}$ | $2.0 \times 10^{-4}$ |
| Total content A of a water-soluble organic solvent(s) (*3) | 49.0 | 51.0 |
| Content B of a water-soluble organic solvent(s) having a particular specific dielectric constant (*4) | 14.0 | 18.0 |
| B/A [%] (*5) | 28.6 | 35.3 |
| $d_{75}$ value [nm] | 7.45 | 11.80 |

(*1) Average molecular weight: 200
(*2) Acetylene glycol ethylene oxide adduct (surfactant: Kawaken Fine Chemicals Co., Ltd.)
(*3) The total content A (mass %) of a water-soluble organic solvent(s) in an ink except a polyvalent metal
(*4) The content B (mass %) of a water-soluble organic solvent(s) having a specific dielectric constant of 10.0 or more and less than 30.0 at 20° C.
(*5) The ratio (%) of the content B to the total content A (Evaluation)

Ejection Stability

Each reactive ink of Example 8 or 9 obtained above was filled in ink cartridges for an ink jet recording apparatus (trade name: PIXUS9501; Canon Inc.). The obtained ink cartridge was loaded on a remodeled ink jet recording apparatus (trade name: PIXUS9501; Canon Inc.). Then, images whose recording duty was varied at intervals of 10% between from 10% to 100% were formed on Professional Photo Paper PR-101 (Canon Inc.).

As a result, the reactive ink of Example 8 exhibited no disturbance in recording as in the reactive inks of Examples 1 to 7. On the other hand, the reactive ink of Example 9 exhibited a slight disturbance in recording.

Bronzing Resistance and Bleeding Resistance

The reactive inks and the pigment inks of Examples 8 and 9 were evaluated for the bronzing resistance and the bleeding resistance by the methods and standards as described above. The evaluation results are shown in Table 10.

TABLE 10

|  |  | Bronzing resistance | Bleeding resistance |
|---|---|---|---|
| Example | 8 | AA | AA |
|  | 9 | AA | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-064312, filed Mar. 9, 2006, which is hereby incorporated by reference herein in its entirety.

What is claimed is:

1. An ink jet ink for use together with a pigment ink, wherein:
   the ink jet ink comprises a coloring material, a polyvalent metal and a water-soluble organic solvent;
   the coloring material comprises at least a compound represented by the following general formula (I);
   a content (mol/g) of the polyvalent metal is $2.0 \times 10^{-6}$ mol/g or more and $4.0 \times 10^{-4}$ mol/g or less;
   a total content (mass %) of the water-soluble organic solvent is 25.0 mass % or more with respect to the total mass of the ink; and
   in a dispersion distance distribution, measured by a small angle X-ray scattering method, of molecular aggregates in the ink jet ink whose coloring material concentration is adjusted to 0.5 mass %, a dispersion distance $d_{25}$ value corresponding to 75% of a distribution is 12.60 nm or less:

General Formula (I)

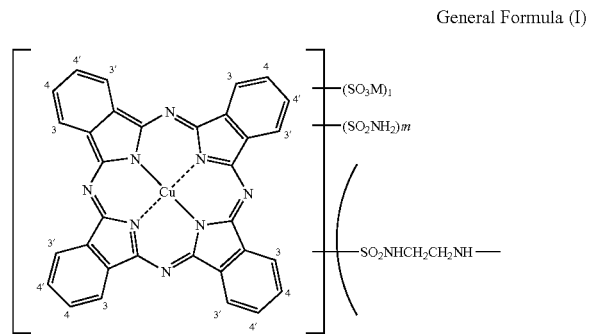

-continued

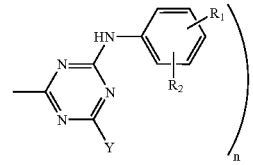

wherein, M represents an alkali metal or ammonium; $R_1$ and $R_2$ each independently represent a hydrogen atom, a sulfonate group or a carboxyl group, provided that $R_1$ and $R_2$ are not simultaneously a hydrogen atom; Y represents a chlorine atom, a hydroxyl group, an amino group or a mono- or di-alkylamino group; l=0 to 2, m=1 to 3 and n=1 to 3, provided that l+m+n=3 to 4; and a substitution position of a substituent is one of 4-position and 4'-position.

2. An ink jet ink for use together with a pigment ink, wherein:
   the ink jet ink comprises a coloring material, a polyvalent metal and a water-soluble organic solvent;
   the coloring material comprises a compound represented by the following general formula (I);
   a content (mol/g) of the polyvalent metal is $2.0 \times 10^{-6}$ mol/g or more and $4.0 \times 10^{-4}$ mol/g or less;
   a total content (mass %) of the water-soluble organic solvent is 15.0 mass % or more with respect to the total mass of the ink;
   the water-soluble organic solvent comprises a water-soluble organic solvent having a specific dielectric constant at 20° C. of 10.0 or more and less than 30.0, and a content of the water-soluble organic solvent having a specific dielectric constant at 20° C. of 10.0 or more and less than 30.0 is 25.0 mass % or more with respect to the total content of the water-soluble organic solvent in the ink; and
   in a dispersion distance distribution, measured by a small angle X-ray scattering method, of molecular aggregates in the ink jet ink whose coloring material concentration is adjusted to 0.5 mass %, a dispersion distance $d_{75}$ value corresponding to 75% of a distribution is 12.60 nm or less:

General Formula (I)

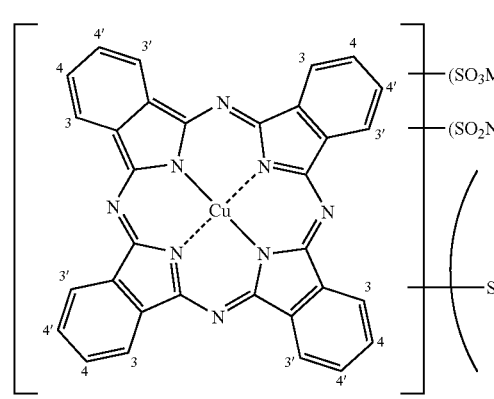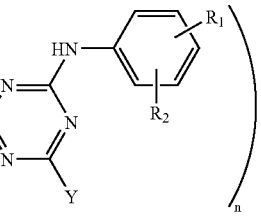

wherein, M represents an alkali metal or ammonium; $R_1$ and $R_2$ each independently represent a hydrogen atom, a sulfonate group or a carboxyl group, provided that $R_1$ and $R_2$ are not simultaneously a hydrogen atom; Y represents a chlorine atom, a hydroxyl group, an amino group or a mono- or di-alkylamino group; $l=0$ to 2, $m=1$ to 3 and $n=1$ to 3, provided that $l+m+n=3$ to 4; and a substitution position of a substituent is one of 4-position and 4'-position.

3. The ink jet ink according to claim 2, wherein the water-soluble organic solvent having a specific dielectric constant at 20° C. of 10.0 or more and less than 30.0 is at least one selected from the group consisting of polyethylene glycol having an average molecular weight of 200, isopropyl alcohol, 2-pyrrolidone, 1,5-pentanediol, and 1,2,6-hexanetriol.

4. The ink jet ink according to claim 1, wherein the content (mol/g) of the polyvalent metal is $7.8 \times 10^{-5}$ mol/g or more and $4.0 \times 10^{-4}$ mol/g or less.

5. The ink jet ink according to claim 1, wherein the content (mass %) of the coloring material is 3.0 mass % or more and 10.0 mass % or less with respect to the total mass of the ink.

6. The ink jet ink according to claim 1, wherein the $d_{75}$ value is 6.70 nm or more.

7. The ink jet ink according to claim 2, wherein the $d_{75}$ value is 6.70 nm or more.

8. The ink jet ink according to claim 1, wherein the total content (mass %) of the water-soluble organic solvent is 50.0 mass % or less with respect to the total mass of the ink.

9. The ink jet ink according to claim 2, wherein the total content (mass %) of the water-soluble organic solvent is 50.0 mass % or less with respect to the total mass of the ink.

10. An ink jet recording method, comprising ejecting an ink by an ink jet method to perform recording, wherein the ink comprises the ink jet ink and a pigment ink according to claim 1.

11. An ink cartridge comprising an ink storage portion for storing an ink, wherein the ink comprises the ink jet ink according to claim 1.

12. An ink set comprising a plurality of inks, wherein the ink set comprises, at least, a pigment ink and an ink that reacts with the pigment ink, and the ink that reacts with the pigment ink is the ink jet ink according to claim 1.

13. An image forming method comprising the steps of forming images using, at least, a pigment ink and an ink that reacts with the pigment ink, wherein the ink that reacts with the pigment ink is the ink jet ink according to claim 1.

14. The ink jet ink according to claim 2, wherein the content (mol/g) of the polyvalent metal is $7.8 \times 10^{-5}$ mol/g or more and $4.0 \times 10^{-4}$ mol/g or less.

15. The ink jet ink according to claim 2, wherein the content (mass %) of the coloring material is 3.0 mass % or more and 10.0 mass % or less with respect to the total mass of the ink.

16. An ink jet recording method, comprising ejecting an ink by an ink jet method to perform recording, wherein the ink comprises the ink jet ink and a pigment ink according to claim 2.

17. An ink cartridge comprising an ink storage portion for storing an ink, wherein the ink comprises the ink jet ink according to claim 2.

18. An ink set comprising a plurality of inks, wherein the ink set comprises, at least, a pigment ink and an ink that reacts with the pigment ink, and the ink that reacts with the pigment ink is the ink jet ink according to claim 2.

19. An image forming method comprising the steps of forming images using, at least, a pigment ink and an ink that reacts with the pigment ink, wherein the ink that reacts with the pigment ink is the ink jet ink according to claim 2.

* * * * *